United States Patent
One et al.

(10) Patent No.: US 9,242,373 B2
(45) Date of Patent: Jan. 26, 2016

(54) CONTROL DEVICE, CONTROL METHOD, AND CONTROL PROGRAM FOR ARTICULATED ROBOT

(75) Inventors: Tsutomu One, Kobe (JP); Toshihiko Nishimura, Kobe (JP); Masayuki Shigeyoshi, Fujisawa (JP); Takeshi Koike, Fujisawa (JP)

(73) Assignee: Kobe Steel, Ltd., Hyogo (JP)

( * ) Notice: Subject to any disclaimer, the term of this patent is extended or adjusted under 35 U.S.C. 154(b) by 81 days.

(21) Appl. No.: 14/003,429

(22) PCT Filed: Mar. 2, 2012

(86) PCT No.: PCT/JP2012/055313
§ 371 (c)(1),
(2), (4) Date: Sep. 5, 2013

(87) PCT Pub. No.: WO2012/121124
PCT Pub. Date: Sep. 13, 2012

(65) Prior Publication Data
US 2013/0345868 A1      Dec. 26, 2013

(30) Foreign Application Priority Data

Mar. 8, 2011  (JP) ................................ 2011-050459
Nov. 22, 2011 (JP) ................................ 2011-254807

(51) Int. Cl.
*B25J 9/16* (2006.01)
*B23K 9/095* (2006.01)
*B23K 9/12* (2006.01)
*G05B 19/4103* (2006.01)

(52) U.S. Cl.
CPC ............... *B25J 9/1628* (2013.01); *B23K 9/095* (2013.01); *B23K 9/12* (2013.01); *B25J 9/1664* (2013.01); *G05B 19/4103* (2013.01); *G05B 2219/42207* (2013.01)

(58) Field of Classification Search
CPC ................. G05B 19/4103; G05B 2219/34083; G05B 2219/42207; B25J 9/1643
See application file for complete search history.

(56) References Cited

U.S. PATENT DOCUMENTS 4,623,971 A * 11/1986 Ailman et al. ................. 700/252
4,680,519 A *  7/1987 Chand et al. ............. 318/568.19
(Continued)

FOREIGN PATENT DOCUMENTS

JP      02-218569 A      8/1990
JP      05-005270 A      1/1993
(Continued)

OTHER PUBLICATIONS

International Search Report; PCT/JP2012/055313; May 29, 2012.
(Continued)

*Primary Examiner* — Khoi Tran
*Assistant Examiner* — Ryan Rink
(74) *Attorney, Agent, or Firm* — Studebaker & Brackett PC

(57) ABSTRACT

The purpose of the present invention is to have the angles of each of the drive shafts of the first articulated drive system infallibly reach the angle of the work completed position, while maintaining the rate of movement and position of the working parts of an articulated robot. If exception conditions are not satisfied, the drive shafts of first and second articulation drive systems are driven individually (S64) on the basis of interpolated points calculated in step 5 (S5). After exception conditions are satisfied (Yes side of S61), until the working parts reach the work completed position (No side of S12), the angle of each of the drive shafts of the first articulated drive system required to vary each of the drive shafts of the first articulated drive system in a linear manner with the angle at the work completed position as a target is calculated (S8), and the angle of each of the drive shafts of the second articulated drive system is calculated on the basis of the position of the working part at the interpolated point calculated in step 5 (S5) and the angle of each of the drive shafts of the first articulated drive system as calculated (S9), and the drive shafts of the first and second articulated drive systems are driven according to said calculation results (S11).

5 Claims, 14 Drawing Sheets

(56) References Cited

U.S. PATENT DOCUMENTS

| | | | |
|---|---|---|---|
| 4,716,350 A * | 12/1987 | Huang et al. | 318/568.2 |
| 5,187,418 A * | 2/1993 | Minami et al. | 318/568.19 |
| 6,845,295 B2 * | 1/2005 | Cheng et al. | 700/245 |
| 2009/0179021 A1 | 7/2009 | Nishimura et al. | |
| 2010/0204828 A1 * | 8/2010 | Yoshizawa et al. | 700/245 |
| 2011/0106305 A1 * | 5/2011 | Brethe | 700/245 |

FOREIGN PATENT DOCUMENTS

| | | |
|---|---|---|
| JP | H05-005270 U | 1/1993 |
| JP | 09-076178 A | 3/1997 |
| JP | 10-315169 A | 12/1998 |
| JP | 2008-036742 A | 2/2008 |
| JP | 2009-113172 A | 5/2009 |
| JP | 2009-166076 A | 7/2009 |
| KR | 1995-0011071 A | 5/1995 |
| KR | 2004-0034167 A | 4/2004 |
| KR | 2009-0078737 A | 7/2009 |

OTHER PUBLICATIONS

Written Opinion of the International Searching Authority; PCT/JP2012/055313; May 29, 2012.

* cited by examiner

TORCH INCLINATION ANGLE Rx

CONTROL DEVICE, CONTROL METHOD, AND CONTROL PROGRAM FOR ARTICULATED ROBOT

TECHNICAL FIELD

The present invention relates to a control technique for an articulated robot including a first articulated drive system, which includes three drive shafts for changing an attitude of a working part disposed at a forward end, and a second articulated drive system, which includes at least three drive shafts for changing a position of the first articulated drive system.

BACKGROUND ART

A 6-axis manipulator, illustrated in FIG. 23, as one type of an articulated robot includes a first articulated drive system, which includes a J4 axis, a J5 axis, and a J6 axis for changing an attitude of an end effector (working part) disposed at a forward end, and a second articulated drive system, which includes a J1 axis, a J2 axis, and a J5 axis for changing a position of the first articulated drive system. A control device for the 6-axis manipulator changes the position and the attitude of the end effector by controlling the J1 axis to J6 axis based on respective positions and attitudes of the end effector at a work start point and a work end point that are set in advance.

In more detail, plural interpolation points for interpolating a teaching path interconnecting the work start point and the work end point are calculated, and the J1 axis to the J6 axis are driven in accordance with the calculated interpolation points. When position coordinates X, Y and Z and attitude angles α, β and γ of the end effector are given, respective articulation angles θ1 to θ6 of the J1 axis to the J6 axis can be determined by finding the solution of an inverse kinematic problem. However, when the inverse kinematic problem is solved, there are two kinds of solutions for the articulation angles θ1 to θ6. More specifically, the angles θ'4 and θ'4 of the J4 axis, the angles θ5 and θ'5 of the J5 axis, and the angles θ6 and θ'6 of the J6 axis in the two kinds of solutions are related to each other by expressions of θ4−θ'4=±180 degrees, θ5+θ'5=0 degree, and θ6−θ'6=±180 degrees.

Meanwhile, when the angle of the J5 axis becomes 0 degree in the 6-axis manipulator, the manipulator takes the so-called singular attitude (singular point) at which speeds of the J4 axis and the J6 axis change abruptly. In general, therefore, the singular attitude is avoided by causing the angle of the J5 axis to change in the same sign as that of the solution at the work start point. In that case, however, when the angle of the J5 axis takes different sings signs at the work start point and the work end point, the angle of the J5 axis cannot be made to reach an angle to be taken at the work end point.

On the other hand, Patent Literature 1, for example, discloses a technique for transiting the angle to the other solution of the inverse kinematic problem when it is detected that the manipulator is in the vicinity of the singular attitude. With such a technique, even when the angle of the J5 axis takes different signs at the work start point and the work end point, the angle of the J5 axis can be made to reach the angle to be taken at the work end point. In general, the singular attitude is detected on condition that the angle of the J5 axis reaches the vicinity of 0 degrees, or that the angles of the J4 axis and the J6 axis change abruptly.

CITATION LIST

Patent Literature

PTL 1: Japanese Unexamined Patent Application Publication No. 02-218569

SUMMARY OF INVENTION

Technical Problem

With the technique according to PTL 1, however, since reaching the vicinity of the singular attitude is the condition for the transition to the other solution of the inverse kinematic problem, drive shafts cannot be made to reach the angles to be taken at the work end point when the drive shafts are operated without coming close to the attitude at the singular point.

In more detail, FIG. 24 illustrates the loci of the J4 to J6 axes when the angle of the J5 axis takes different signs at the work start point and the work end point, but when the manipulator is operated in such a manner that the angle of the J5 does not reach the vicinity of 0 degree and that the angles of the J4 and J6 axes do not change abruptly. In the above case, it is not detected that the manipulator has come close to the vicinity of the singular attitude. Thus, because the J5 axis is moved while the angle of the J5 axis remains the same sign as that at the work start point, the angles of the J4 to J6 axes cannot be made to reach the proper angles to be taken at the work end point. As a result, there is a possibility that the angles of the J4 to J6 axes may reach outside the operation range, for example, when the manipulator is operated toward a next teaching point subsequent to the work end point.

Accordingly, the present invention has been made in view of the above-described situations in the art, and an object of the present invention is to provide a control device, a control method, and a control program for a articulated robot, which enable respective angles of drive shafts of a first articulated drive system to reliably reach angles to be taken at a work end point while a position and a moving speed of a working part are maintained.

Solution to Problem

To achieve the above object, the present invention is applied to an articulated robot control device for controlling an articulated robot including a first articulated drive system, which includes three drive shafts for changing an attitude of a working part disposed at a forward end, and a second articulated drive system, which includes at least three drive shafts for changing a position of the first articulated drive system. The control device is featured in having the following means (1) to (4).

(1) Interpolation point calculating means for calculating a plurality of interpolation points to move a position of the working part at a predetermined speed on a teaching path interconnecting respective positions and attitudes at a work start point and a work end point, which are set in advance.

(2) Driving control means for driving the first articulated drive system and the second articulated drive system in accordance with the interpolation points calculated by the interpolation point calculating means.

(3) Exception condition determining means for determining whether or not a preset exception condition, which is different from a condition for detecting a singular attitude of the first articulated drive system, is satisfied when the first articulated drive system and the second articulated drive system are driven by the driving control means.

(4) Exceptional operation means for, after the exception condition determining means determines that the exception condition is satisfied, calculating respective angles of the drive shafts of the first articulated drive system, which are adapted to linearly change the drive shafts of the first articulated drive system with angles to be taken at the work end point being targets, until the working part reaches the work end point, calculating respective angles of the drive shafts of the second articulated drive system based on the respective calculated angles of the drive shafts of the first articulated drive system and on the position of the working part at the interpolation point calculated by the interpolation point calculating means, and driving the respective drive shafts of the first articulated drive system and the second articulated drive system based on calculation results.

With the features described above, the respective angles of the drive shafts of the first articulated drive system can be made to reliably reach the angles to be taken at the work end point while the position and the moving speed of the working part at the interpolation point calculated by the interpolation point calculating means are maintained, regardless whether signs of the angles of a central drive shaft of the first articulated drive system at the work start point and the work end point are the same or different.

For example, the exception condition is given as a condition that a speed of at least one of the drive shafts of the first articulated drive system exceeds a preset allowable range when the respective angles of the drive shafts of the first articulated drive system are made to reach the angles to be taken at the work end point in a remaining moving time or a remaining moving distance of the working part from a next interpolation point. With that feature, the respective speeds of the drive shafts of the first articulated drive system can be made to reach the angles to be taken at the work end point while the respective speeds of the drive shafts of the first articulated drive system are each held within the allowable range. As an alternative, the exception condition may be given as a condition that a remaining moving time or a remaining moving distance of the working part reaches a preset certain value or below.

Furthermore, the exception condition may be given as a condition that an angle of at least one of the drive shafts of the first articulated drive system at a next interpolation point departs from a reference angle, which is determined based on the work start point and/or the work end point, by a preset certain angle or more. With that feature, it is possible, for example, to prevent the respective angles of the drive shafts of the first articulated drive system from departing too away from the reference angles, thus avoiding the respective speeds of the drive shafts from changing abruptly until reaching the work end point, and to make the drive shafts of the first articulated drive system reliably reach the work end point.

Furthermore, the exception condition may be given as a condition that an angle of at least one of the drive shafts of the first articulated drive system at a next interpolation point exceeds a preset operation range. With that feature, the respective angles of the drive shafts of the first articulated drive system can be made to reach the angles to be taken at the work end point while the drive shafts are each driven without exceeding the operation range.

When the articulated robot control device includes deviation amount detecting means for detecting a deviation amount between the working part and a work line of a workpiece, and copying control means for moving the working part to trace the work line based on the deviation amount detected by the deviation amount detecting means, the position of the work end point is changed.

In view of such a point, the articulated robot control device may further include work end point update means for updating the work end point by adding the deviation amount, which is detected by the deviation amount detecting means, to the work end point, and the exception condition determining means and/or the exceptional operation means may execute processing based on the work end point after being updated by the work end point update means. With that feature, even when copying control is executed by the copying control means, the exceptional operation means enables the drive shafts to reach the work end point after being updated by the work end point update means. The determination of the exception condition by the exception condition determining means can also be properly executed on the basis of the work end point after being updated by the work end point update means.

Moreover the exceptional operation means may comprise angle candidate calculating means for calculating a plurality of angle candidates for each of the drive shafts within a range of angle closer to the target than when each of the drive shafts of the first articulated drive system is linearly operated with the angle to be taken at the work end point being the target, and angle selecting means for selecting, from the angle candidates calculated by the angle candidate calculating means, one at which variations of preset one or two particular components among components of three attitude angles in a work coordinate system, as viewed from the working part, at a next interpolation point are most suppressed, when the angle candidates are each separately employed.

With that feature, the drive shafts of the first articulated drive system can be made to reliably reach the angles to be taken at the work end point while the variations of the particular components are suppressed.

The present invention can also be regarded as a control method and a control program for an articulated robot.

Thus, the present invention may be provided as a control method and a control program for an articulated robot, the control method comprising the following steps, the control program causing a processor to execute the following steps, i.e., an interpolation point calculating step of calculating a plurality of interpolation points to move a position of the working part at a predetermined speed on a teaching path interconnecting respective positions and attitudes at a work start point and a work end point, which are set in advance, a driving control step of driving the first articulated drive system and the second articulated drive system in accordance with the interpolation points calculated in the interpolation point calculating step, an exception condition determining step of determining whether or not a preset exception condition, which is different from a condition for detecting a singular attitude of the first articulated drive system, is satisfied when the first articulated drive system and the second articulated drive system are driven in the driving control step, and an exceptional operation step of; after the exception condition determining step determines that the exception condition is satisfied, calculating respective angles of the drive shafts of the first articulated drive system, which are adapted to linearly change the drive shafts of the first articulated drive system with angles to be taken at the work end point being targets, until the working part reaches the work end point, calculating respective angles of the drive shafts of the second articulated drive system based on the respective calculated angles of the drive shafts of the first articulated drive system and on the position of the working part at the interpolation point calculated in the interpolation point calculating step, and driving the respective drive shafts of the first articulated drive system and the second articulated drive system based on calculation results.

Advantageous Effects of Invention

According to the present invention, the respective angles of the drive shafts of the first articulated drive system can be made to reliably reach the angles to be taken at the work end point while the position and the moving speed of the working part at the interpolation point calculated by the interpolation point calculating means are maintained, regardless whether signs of the angles of the central drive shaft of the first articulated drive system at the work start point and the work end point are the same or different.

DESCRIPTION OF EMBODIMENTS

An embodiment of the present invention will be described below with reference to the accompanying drawings for understanding of the present invention. It is to be noted that the following embodiment is one practical example of the present invention and is not intended to limit the technical scope of the present invention.

Figure 1:
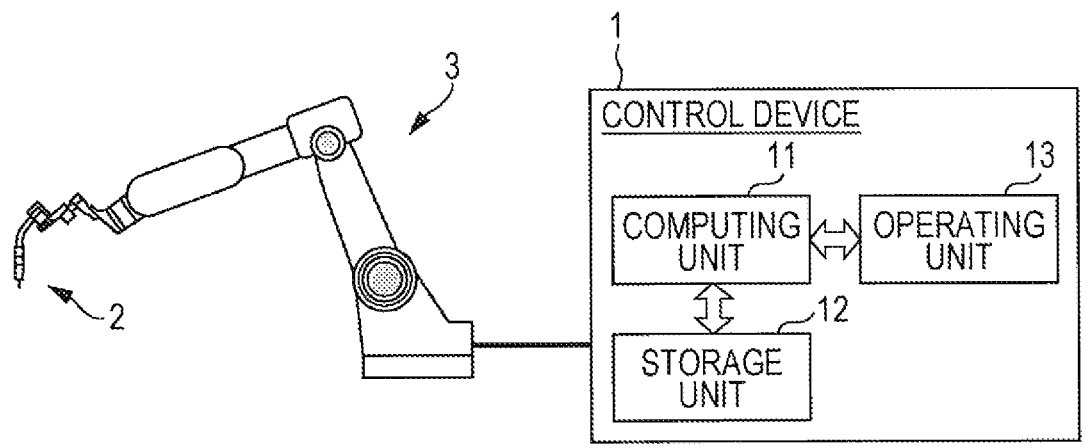
FIG. 1 is a block diagram representing basic configurations of an articulated robot control device 1 and an articulated robot 3 according to an embodiment of the present invention.

As illustrated in FIG. 1, an articulated robot control device 1 (hereinafter abbreviated to a "control device 1") according to the embodiment of the present invention is to control the operation of an articulated robot 3 including an end effector 2 disposed at a forward end. The control device 1 includes a computing unit 11, a storage unit 12, an operating unit 13, and so on. The end effector 2 is a welder (torch), an applicator, a tool, a capturer or the like, which carries out an operation, e.g., welding or coating, on a workpiece.

The storage unit 12 includes a ROM or a HDD, for example, in which predetermined control programs, parameter information to be referred during various processes, etc. are stored in advance, and a volatile memory, such as an EEPROM, which is employed as a working area (temporary storage area) when the various process are executed in the computing unit 11.

The operating unit 13 serves as a user interface including sheet keys, operating buttons, operating levers, and so on. The operating unit 13 inputs, to the computing unit 11, an operation signal corresponding to a user's manipulation. More specifically, various parameters, such as a work start point, a work end point, a working time, a moving speed, of the articulated robot 3 are set with the operating unit 13 manipulated by the user.

The computing unit 11 is a processor, e.g., a CPU, for executing various processes, such as a later-described robot control process (see FIG. 3), in accordance with the control programs stored in the storage unit 12. It is to be noted that the present invention may also be regarded as an invention of a control program for causing the computing unit 11 to execute the later-described robot control process.

Figure 2:
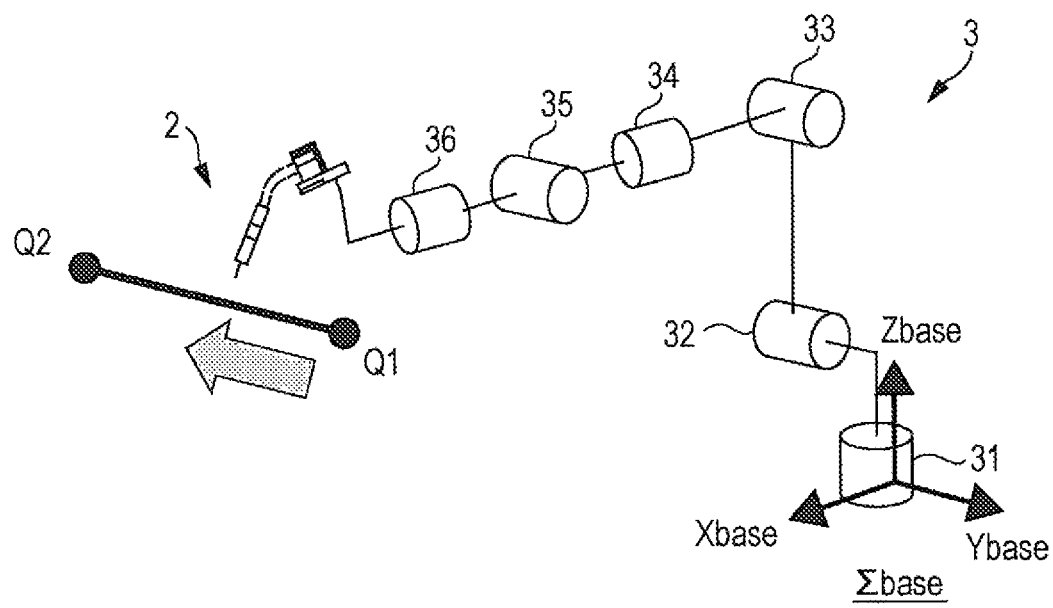
FIG. 2 illustrates a model of an articulated drive system in the articulated robot 3.

FIG. 2 illustrates a model of an articulated drive system in the articulated robot 3.

As illustrated in FIG. 2, the articulated robot 8 includes a first articulated drive system, which includes three drive shafts 34 to 36 for changing an attitude of the end effector 2, and a second articulated drive system, which includes three drive shafts 31 to 33 coupled to the drive shaft 34 at a tail end of the first articulated drive system and changing a position of the first articulated drive system. The drive shafts 31 to 36 are individually driven by drive means, e.g., electric motors, to rotate over a range of ±180 degrees, for example. The second articulated drive system may include four or more drive shafts.

A position and an attitude of the end effector 2 in the articulated robot 3 are expressed by position coordinates XYZ and attitude angles αβγ in a base coordinate system Σbase of the articulated robot 8. The attitude angles αβγ are expressed using, e.g., Euler angles or roll, pitch and yaw angles. Herein, the second articulated drive system can freely create the position coordinates XYZ of the end effector 2 in the base coordinate system Σbase of the articulated robot 3 regardless of the operations of the drive shafts 34 to 36 of the first articulated drive system.

Respective angles θ1 to θ6 of the drive shafts 31 to 36 in the articulated robot 3 can be calculated by finding the solution of an inverse kinematic problem from the position coordinates XYZ and the attitude angles αβγ in the base coordinate system Σbase of the articulated robot 3.

Figure 3:
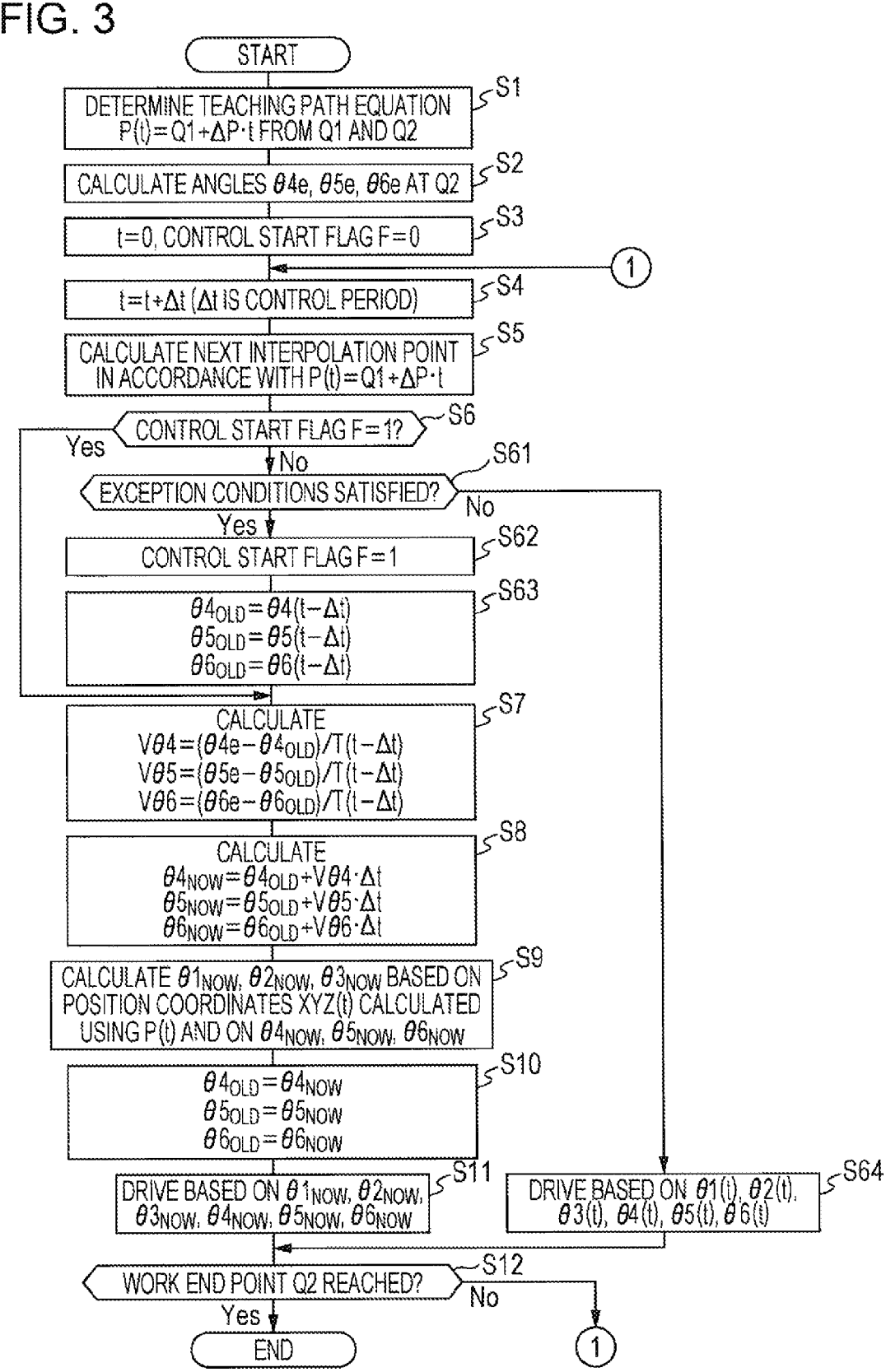
FIG. 3 is a flowchart illustrating one example of procedures of a robot control process executed by the articulated robot control device 1 according to the embodiment of the present invention.

One example of procedures of the robot control process executed by the control device 1 will be described below with reference to a flowchart of FIG. 3. S1, S2 and so on in FIG. 3 denote numbers assigned to the processing procedures (steps). It is to be noted that the present invention may also be regarded as an invention of a control method for an articulated robot, the method executing the following steps of the processing procedures.

The control device 1 controls the articulated robot 3 based on the work start point and the work end point, which are set in advance through the operating unit 13, by executing the robot control process. It is here assumed that a position and attitude [Xs, Ys, Zs, αs, βs, γs] of the end effector 2 at a work start point Q1 and a position and attitude [Xe, Ye, Ze, αe, βe, γe] of the end effector 2 at a work end point Q2 are preset with user's manipulations made on the operating unit 13.

(Step S1)

First, in step S1, the control device 1 determines a path equation P(t)=Q1+ΔP·t for calculating plural interpolation points to interpolate a teaching path, which interconnects the respective positions and attitudes at the work start point Q1 and the work end point Q2. Herein, ΔP denotes an amount by which the position of the end effector 2 is moved per unit time (1 msec), and t denotes a control time [msec] counted from the work start point Q1. The interpolation points calculated with the path equation P(t) are each expressed using the position and attitude XYZαβγ(t) in the base coordinate system Σbase of the articulated robot 3.

In more detail, the path equation P(t) is used to calculate the plural interpolation points to move the position of the end effector 2 from the work start point Q1 to the work end point Q2 at a predetermined speed. More specifically, assuming that a total control time taken for the position of the end effector 2 to move from the work start point Q1 to the work end point Q2 is T [msec], respective change amounts of the position and attitude XYZαβγ of the end effector 2 per unit time (1 msec) are ΔX, ΔY, ΔZ, Δα, Δβ and Δγ, ΔP is expressed by (Q2−Q1)/T={ΔX=(Xe−Xs)/T, ΔY=(Ye−Ys)/T, ΔZ=(Ze−Zs)/T, Δα=(αe−αs)/T, Δβ=(βe−βs)/T, Δγ=(γe−γs)/T}. As a matter of course, the moving speed of the end effector 2 may be set to a predetermined speed without being limited to the case where the total control time T is set.

(Steps S2 to S3)

Subsequently, in step S2, the control device 1 finds the solution of the inverse kinematic problem regarding the position and attitude [Xe, Ye, Ze, αe, βe, γe] of the end effector 2 at the work end point Q2, thereby calculating respective angles [θ1e, θ2e, θ3e, θ4e, θ5e, θ6e] of the drive shafts 31 to 36 at the work end point Q2. As an alternative, the angles θ1e to θ6e of the drive shafts 31 to 36 at the work end point Q2 may be directly set when the teaching is made through the operating unit 13.

In step S3, the control device 1 initializes the control time t and a control start flag F to 0. The control start flag F represents information indicating whether or not a later described exception condition (S61) is already satisfied, and it is set to 1 in step S62 described later.

(Steps S4 to S6)

Next, in step S4, the control device 1 updates the control time t (t=t+Δt). Herein, Δt denotes a control period (sampling period) for the articulated robot 3 with the control device 1, and it is, e.g., 10 [msec] or 100 [msec].

In step S5, the control device 1 then calculates the angles θ1(t) to θ6(t) of the drive shafts 31 to 36 at the next interpolation point in accordance with the path equation P(t). Herein, the control device 1 in executing such a calculation process corresponds to interpolation point calculating means.

More specifically, the control device 1 first calculates the position and attitude XYZαβγ(t)={Xs+ΔX·t, Ys+ΔY·t, Zs+ΔZ·t, αs+Δα·t, Δβ·t, γs+Δγ·t} at the next interpolation point. Then, the control device 1 finds the solution of the inverse kinematic problem regarding the position and attitude XYZαβγ(t), thereby calculating respective angles [θ1(t), θ2(t), θ3(t), θ4(t), θ5(t), θ6(t)] of the drive shafts 31 to 36 at the next interpolation point. It is to be noted that after the control start flag F is set to 1, the process of step S5 may be omitted because the angles θ1(t) to θ6(t) are not used.

Thereafter, in step S6, the control device 1 determines whether or not the control start flag F is 1. If it is determined that the control start flag F is 1 (Yes side of S6), the process is shifted to step S7. If it is determined that the control start flag F is 0 (No side of S6), the process is shifted to step S61.

(Step S61)

In step S61, the control device 1 determines whether or not a preset exception condition different from a condition for detecting a singular attitude of the first articulated drive system is satisfied. The step S61 is executed when the drive shafts 31 to 36 of the first articulated drive system and the second articulated drive system are driven in later-described step S64 based on the angles θ1(t) to θ6(t), respectively, which have been calculated in step S5. Herein, the control device 1 in executing the above-described determination process corresponds to exception condition determining means. The condition for detecting the singular attitude of the first articulated drive system is given, for example, as such an event that the angle of the drive shaft 35 comes close to 0, or that the angles of the drive shafts 34 and 36 change abruptly.

More specifically, in the embodiment, the exception condition is assumed to be preset as an event that, when the respective angles of the drive shafts 34 to 36 of the first articulated drive system are made to reach the angles θ4e to θ6e at the work end point Q2 in the remaining moving time of the end effector 2 from the next interpolation point, the speed of at least one of the drive shafts 34 to 36 of the first articulated drive system exceeds a preset allowable range. In other words, the control device 1 determines whether or not the end effector 2 can be made to reach the work end point Q2 in above step S61 in the remaining moving time of the end effector 2 while the respective speeds of the drive shafts 34 to 36 are each maintained within the allowable range.

For example, when any of the following formulae (11) to (13) is held, the control device 1 can determine that the exception condition is satisfied. In the following formulae, T(t) denotes the remaining moving time at the next interpolation point, and θ4d, θ5d and θ6d denote upper limit values of the respective allowable ranges for the speeds of the drive shafts 34 to 36.

$$|(\theta 4e - \theta 4(t))/T(t)| > \theta 4d \tag{11}$$

$$|(\theta 5e - \theta 5(t))/T(t)| > \theta 5d \tag{12}$$

$$|(\theta 6e - \theta 6(t))/T(t)| > \theta 6d \tag{13}$$

It is also possible to determine whether or not the end effector 2 can be made to reach the work end point Q2 in the remaining moving distance (=remaining moving time×moving speed) of the end effector 2, without being limited to the remaining moving time of the end effector 2, while the respective speeds of the drive shafts 34 to 36 are each maintained within the allowable range. As another embodiment, such an event that the remaining moving time or moving distance of the end effector 2 simply reaches a predetermined value or below, which is set in advance, may be employed as the exception condition.

If it is determined in the step S61 that the exception condition is not satisfied (No side of S61), the process is shifted to step S64. If it is determined in the step S61 that the exception condition is satisfied (Yes side of S61), the process is shifted to step S62.

(Step S64)

In step S64, the control device 1 drives the drive shafts 31 to 36 based on the angles $\theta 1(t)$, $\theta 2(t)$, $\theta 3(t)$, $\theta 4(t)$, $\theta 5(t)$ and $\theta 6(t)$ having been calculated in above step S5. Thereafter, the process is shifted to step S12. Since the process in the step S64 is similar to that in the related art, detailed description thereof is omitted. Herein, the control device 1 in executing the above driving process corresponds to driving control means.

(Steps S62 to S63)

On the other hand, if the exception condition is satisfied, the control device 1 sets the control start flag F to 1 in the next step S62. Thus, after this point in time, the control start flag F is determined to be 1 in above step S6, and the process is shifted to later-described step S7 without passing through steps S61 to S63.

In step S63, the control device 1 stores respective current angles of the drive shafts 34 to 36 as $\theta 4_{OLD}$, $\theta 5_{OLD}$ and $\theta 6_{OLD}$ in the storage unit 12. Thus, $\theta 4_{OLD} = \theta 4(t-\Delta t)$, $\theta 5_{OLD} = \theta 5(t-\Delta t)$, and $\theta 6_{OLD} = \theta 6(t-\Delta t)$.

(Steps S7 to S8)

In step S7, the control device 1 then calculates respective speeds $V\theta 4$, $V\theta 5$ and $V\theta 6$ per unit time (1 msec) of the drive shafts 34 to 36, which are required to make the respective angles of the drive shafts 34 to 36 reach the angles to be taken at the work end point Q2 in the remaining moving time $T(t-\Delta t)$ from the current interpolation point. Herein, the speeds $V\theta 4$, $V\theta 5$ and $V\theta 6$ are speeds necessary for causing the respective current angles $\theta 4_{OLD}$, $\theta 5_{OLD}$ and $\theta 6_{OLD}$ of the drive shafts 34 to 36 to linearly change to the angles $\theta 4e$, $\theta 5e$ and $\theta 6e$ at the work end point Q2. More specifically, the speeds $V\theta 4$, $V\theta 5$ and $V\theta 6$ can be calculated in accordance with the following formulae (21) to (23), respectively:

$$V\theta 4 = (\theta 4e - \theta 4_{OLD})/T(t-\Delta t) \quad (21)$$

$$V\theta 5 = (\theta 5e - \theta 5_{OLD})/T(t-\Delta t) \quad (22)$$

$$V\theta 6 = (\theta 6e - \theta 6_{OLD})/T(t-\Delta t) \quad (23)$$

Next, in step S8, the control device 1 calculates respective angles $\theta 4_{NOW}$, $\theta 5_{NOW}$ and $\theta 6_{NOW}$ of the drive shafts 34 to 36 at the next interpolation point based on the speeds $V\theta 4$, $V\theta 5$ and $V\theta 6$ having been calculated in above step S7. Herein, the angles $\theta 4_{NOW}$, $\theta 5_{NOW}$ and $\theta 6_{NOW}$ can be calculated in accordance with the following formulae (31) to (33), respectively:

$$\theta 4_{NOW} = \theta 4_{OLD} + V\theta 4 \cdot \Delta t \quad (31)$$

$$\theta 5_{NOW} = \theta 5_{OLD} + V\theta 5 \cdot \Delta t \quad (32)$$

$$\theta 6_{NOW} = \theta 6_{OLD} + V\theta 6 \cdot \Delta t \quad (33)$$

(Steps S9 to S10)

In step S9, the control device 1 then calculates respective angles $\theta 1_{NOW}$, $\theta 2_{NOW}$ and $\theta 3_{NOW}$ of the drive shafts 31 to 33 of the second articulated drive system at the next interpolation point based on the angles $\theta 4_{NOW}$, $\theta 5_{NOW}$ and $\theta 6_{NOW}$ at the next interpolation point, which have been calculated in above step S8, and on the position coordinates XYZ(t) having been calculated in above step S5.

Because the angles $\theta 1_{NOW}$, $\theta 2_{NOW}$ and $\theta 3_{NOW}$ of the drive shafts 31 to 33 calculated here maintain the position coordinates XYZ(t) having been calculated in above step S5, the position and the moving speed of the end effector 2 maintain the position and the moving speed of the end effector 2 under the driving control in above step S64.

In step S10, the control device 1 stores the respective angles $\theta 4_{NOW}$, $\theta 5_{NOW}$ and $\theta 6_{NOW}$ of the drive shafts 34 to 36 as $\theta 4_{OLD}$, $\theta 5_{OLD}$ and $\theta 6_{OLD}$ for use in the next control period (i.e., $\theta 4_{OLD} = \theta 4_{NOW}$, $\theta 5_{OLD} = \theta 5_{NOW}$, and $\theta 6_{OLD} = \theta 6_{NOW}$).

(Steps S11 to S12)

Thereafter, in step S11, the control device 1 drives the drive shafts 31 to 36 based on the respective angles $\theta 4_{NOW}$, $\theta 5_{NOW}$ and $\theta 6_{NOW}$ of the drive shafts 34 to 36 at the next interpolation point, which have been calculated in above step S8, and on the respective angles $\theta 1_{NOW}$, $\theta 2_{NOW}$ and $\theta 3_{NOW}$ of the drive shafts 31 to 33 at the next interpolation point, which have been calculated in above step S9. Thus, in the robot control process according to the embodiment, after the exception condition is satisfied, the driving control in above step S11 is executed instead of the driving control in above step S64.

In next step S12, the control device 1 determines whether or not the end effector 2 has reached the work end point Q2, and repeatedly executes the process subsequent to above step S4 until the end effector 2 reaches the work end point Q2 (No side of S12). On the other hand, if the end effector 2 reaches the work end point Q2 (Yes side of S12), the robot control process is ended.

In the control device 1 according to the embodiment of the present invention, as described above, after the exception condition is determined as being satisfied, the respective angles of the drive shafts 34 to 36 of the first articulated drive system, which are adapted to linearly change the drive shafts 34 to 36 of the first articulated drive system with the angles to be taken at the work end point Q2 being targets, are calculated until the working part reaches the work end point. Furthermore, the respective angles of the drive shafts 31 to 33 of the second articulated drive system are calculated based on the respective calculated angles of the drive shafts 34 to 36 of the first articulated drive system and on the position of the end effector 2 at the interpolation point calculated in above step S5. The respective drive shafts of the first articulated drive system and the second articulated drive system are driven based on the calculation results. Herein, the control device 1 in executing the above-mentioned process corresponds to exceptional operation means.

Accordingly, the respective angles of the drive shafts 34 to 36 of the first articulated drive system can be made to reliably reach the angles to be taken at the work end point Q2 while the position and the moving speed of the end effector 2 at the interpolation point calculated in above step S5 are maintained. As a result, for example, when the end effector 2 is operated toward the next teaching point from the work end point Q2, the drive shafts 34 to 36 can be avoided from exceeding respective operation ranges.

In particular, the control device 1 is suitably applied to the case where signs of the angles of the drive shaft 35 at the work start point Q1 and the work end point Q2 are different from each other and the angle of the drive shaft 35 cannot be made to reach the angle to be taken at the work end point Q2 unless the first articulated drive system passes the singular attitude (at which the angle of the drive shaft 35 is 0 degree). The above point will be described below with reference to FIGS.

Figure 4:
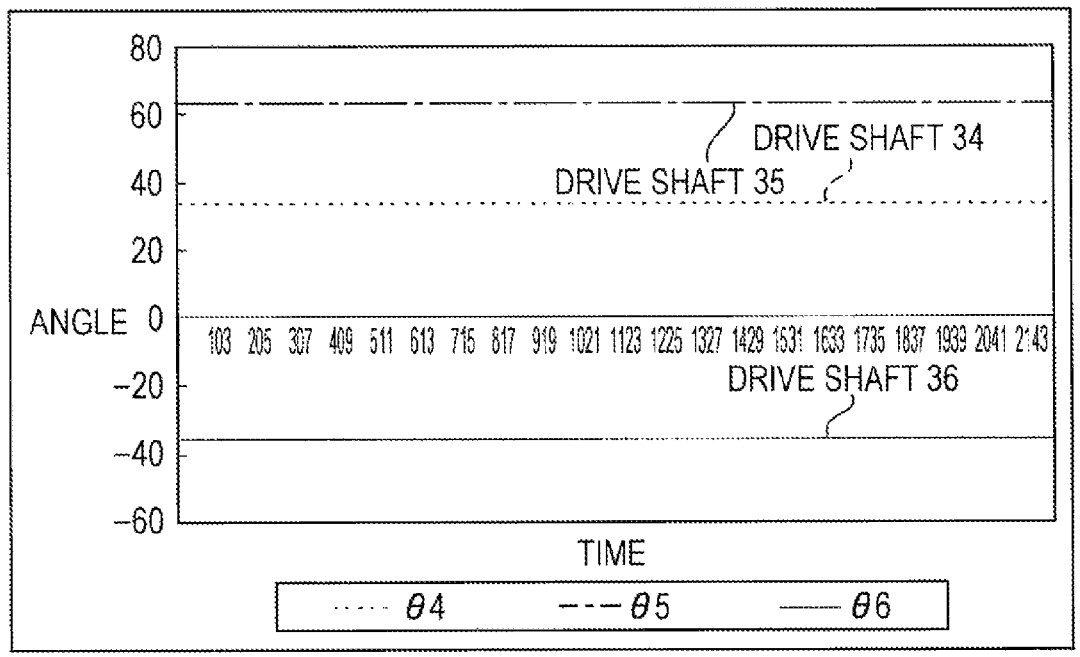
FIG. 4 illustrates an operation example of drive shafts 34 to 36 in the related art.
Figure 5:
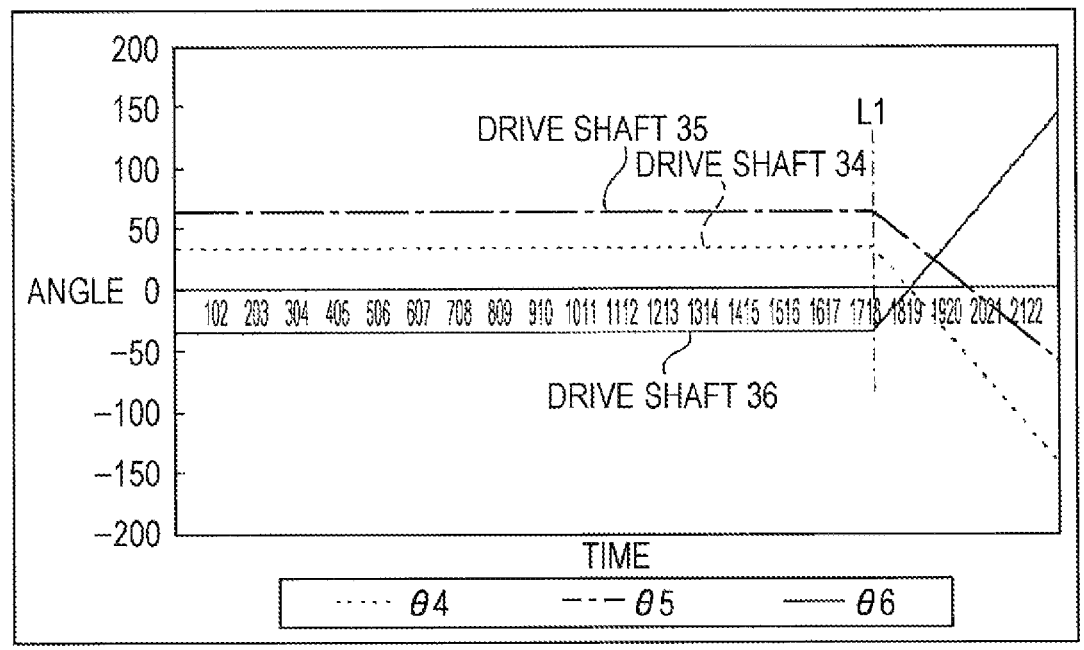
FIG. 5 illustrates an operation example of the drive shafts 34 to 36 when the robot control process according to the embodiment is executed.

4 and 5. FIGS. 4 and 5 illustrate operation examples when the signs of the angles of the drive shaft 85 at the work start point Q1 and the work end point Q2 are different from each other. FIG. 4 represents the related art, and FIG. 5 represents the execution result of the above-described robot control process (FIG. 3). More specifically, the angle θ5s of the drive shaft 35 at the work start point Q1 is +65 degrees, and the angle θ5e of the drive shaft 35 at the work end point Q2 is −65 degrees.

Usually, as illustrated in FIG. 4, when the signs of the angles θ5s and θ5e of the drive shaft 35 at the work start point Q1 and the work end point Q2 are different from each other, the respective angles of the drive shafts 34 to 36 cannot reach the angles to be taken at the work end point Q2 because the end effector 2 is moved using the solution in which the sign of the angle of the drive shaft 35 at the work start point Q1 is maintained same. Hence, there is a possibility that, for example, when the end effector 2 is operated toward the next teaching point from the work end point Q2, the drive shafts 34 to 36 may be operated in excess of the operation ranges. Also, even in the case where the solution is changed over from one to the other by detecting the singular attitude of the first articulated drive system on condition that the angle of the drive shaft 35 comes close to 0 degree or that the speeds of the drive shafts 34 and 36 exceed the predetermined values, the singular attitude of the first articulated drive system cannot be detected unless the angle of the drive shaft 35 does not come close to 0 degree or unless the speeds of the drive shafts 34 and 36 do not exceed the predetermined values, as illustrated in FIG. 4.

On the other hand, as illustrated in FIG. 5, in the case of executing the above-described robot control process (FIG. 3), when it is determined that the exception condition is satisfied at a time L1, the drive shafts 31 to 36 are driven after the time L1 such that the angles of the drive shafts 34 to 36 are linearly changed toward the angles to be taken at the work end point Q2. Therefore, the drive shafts 34 to 36 can be made to reliably reach the angles to be taken at the work end point Q2.

As a matter of course, when the signs of the angles of the drive shaft 35 at the work start point Q1 and the work end point Q2 are the same, the angles of the drive shafts 34 to 36 are also linearly changed toward the angles to be taken at the work end point Q2, as in the above case, after it is determined that the exception condition is satisfied. Therefore, the drive shafts 34 to 36 can be made to reliably reach the angles to be taken at the work end point Q2.

Example 1

In EXAMPLE 1, another example of the exception example in the above-described robot control process (see FIG. 3) is described.

More specifically, in EXAMPLE 1, the control device 1 determines in above step S61 that the exception condition is satisfied, when the angle of at least one of the drive shafts 34 to 36 at the next interpolation point exceeds a preset operation range. Assuming, for example, that respective limits of preset plus-side operation ranges of the drive shafts 34 to 36 are $\theta 4+_L$, $\theta 5+_L$ and $\theta 6+_L$, and that respective limits of preset minus-side operation ranges of the drive shafts 34 to 36 are $\theta 4-_L$, $\theta 5-_L$ and $\theta 6-_L$, the control device 1 determines that the exception condition is satisfied, when at least one of the following formulae (41) to (46) is held. The operation ranges of the drive shafts 34 to 36 are, for example, allowable operation ranges of drive motors for the drive shafts 34 to 36.

$$\theta 4(t) > \theta 4+_L \tag{41}$$

$$\theta 4(t) < \theta 4-_L \tag{42}$$

$$\theta 5(t) > \theta 5+_L \tag{43}$$

$$\theta 5(t) < \theta 5-_L \tag{44}$$

$$\theta 6(t) > \theta 6+_L \tag{45}$$

$$\theta 6(t) < \theta 6-_L \tag{46}$$

Figure 6:
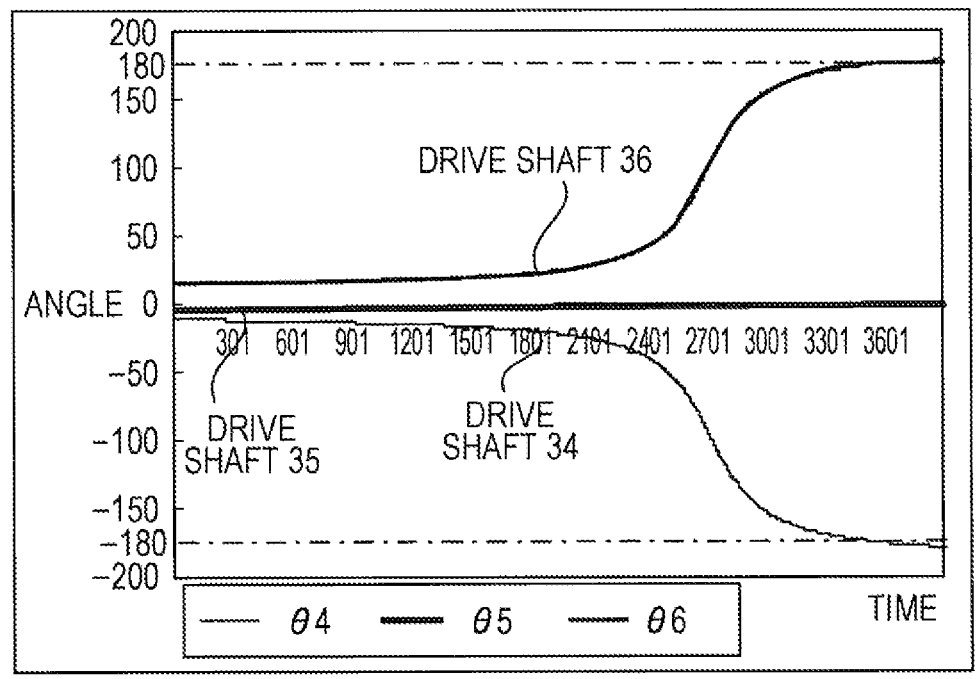
FIG. 6 illustrates an operation example of the drive shafts 34 to 36 in the related art.
Figure 7:
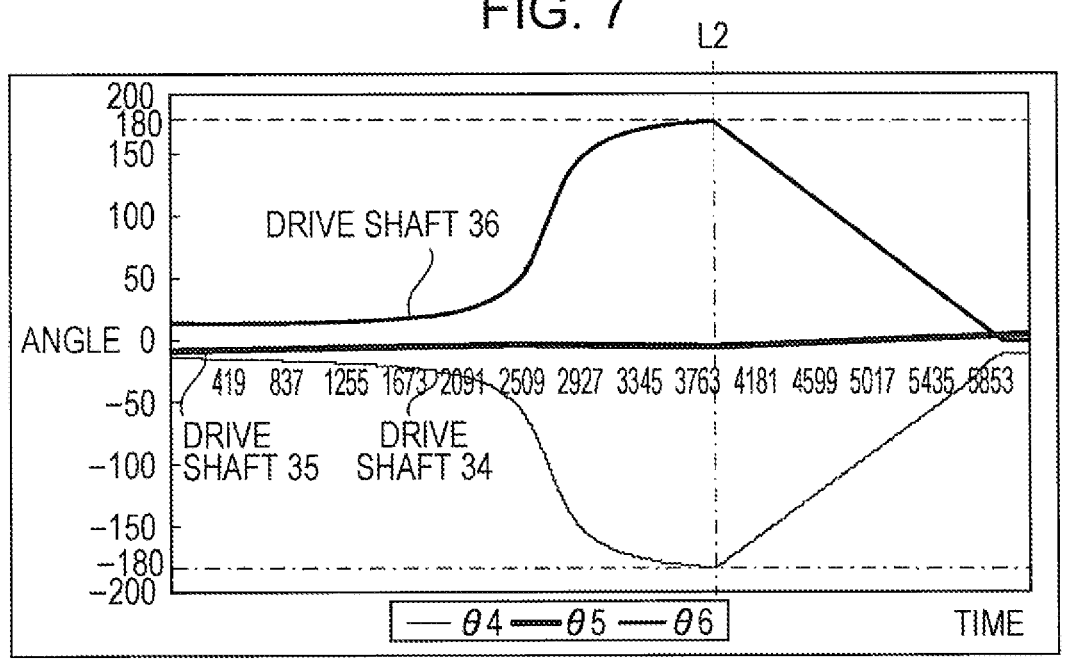
FIG. 7 illustrates an operation example of the drive shafts 34 to 36 when a robot control process according to EXAMPLE 1 is executed.

FIGS. 6 and 7 illustrate operation examples when the signs of the angles of the drive shaft 35 at the work start point Q1 and the work end point Q2 are different from each other. FIG. 6 represents the related art, and FIG. 7 represents the execution result of the robot control process according to EXAMPLE 1. More specifically, the angle θ5s of the drive shaft 35 at the work start point Q1 is −10 degrees, and the angle θ5e of the drive shaft 35 at the work end point Q2 is +10 degrees. It is also assumed that operation ranges of the angles of the drive shafts 34 to 36 are each from −180 degrees to +180 degrees.

As illustrated in FIG. 6, when the end effector 2 is moved by continuously employing the solution in which the sign of the angle of the drive shaft 35 at the work start point Q1 is maintained same in spite of that the signs of the angles of the drive shaft 35 at the work start point Q1 and the work end point Q2 are different from each other, there is a possibility that the angles of the drive shafts 34 and 36 may exceed the operation ranges (±180 degrees) of the drive shafts 34 and 36, thus causing an abnormal stop.

On the other hand, as illustrated in FIG. 7, in the case of executing the above-described robot control process according to EXAMPLE 1, when it is determined that the exception condition of the angle of at least one of the drive shafts 34 to 36 at the next interpolation point exceeding the preset operation range is satisfied at a time L2, the drive shafts 31 to 36 are driven after the time L2 such that the angles of the drive shafts 34 to 36 are linearly changed toward the angles to be taken at the work end point Q2. Generally, in the control device 1, the work end point Q2 can be set only within the operation ranges of the angles of the drive shafts 34 to 36. Therefore, the drive shafts 34 to 36 can be made to reliably reach the angles to be taken at the work end point Q2 while the drive shafts 34 to 36 are driven within the allowable ranges. As a matter of course, when the signs of the angles of the drive shaft 35 at the work start point Q1 and the work end point Q2 are the same, the drive shafts 34 to 36 can also be operated as in the above case.

In the operation example illustrated in FIG. 7, the angles of the drive shafts 34 to 36 reach the vicinity of the work end point Q2 at a time just before the work end point Q2, and thereafter the drive shafts 34 to 36 are operated at slower speeds toward the angles to be taken at the work end point Q2. Vibrations, etc. generated upon stop of the drive shafts 34 to 36 can be suppressed by, as described above, gradually reducing the speeds of the drive shafts 34 to 36 and moderately stopping them at the work end point Q2.

Figure 8:
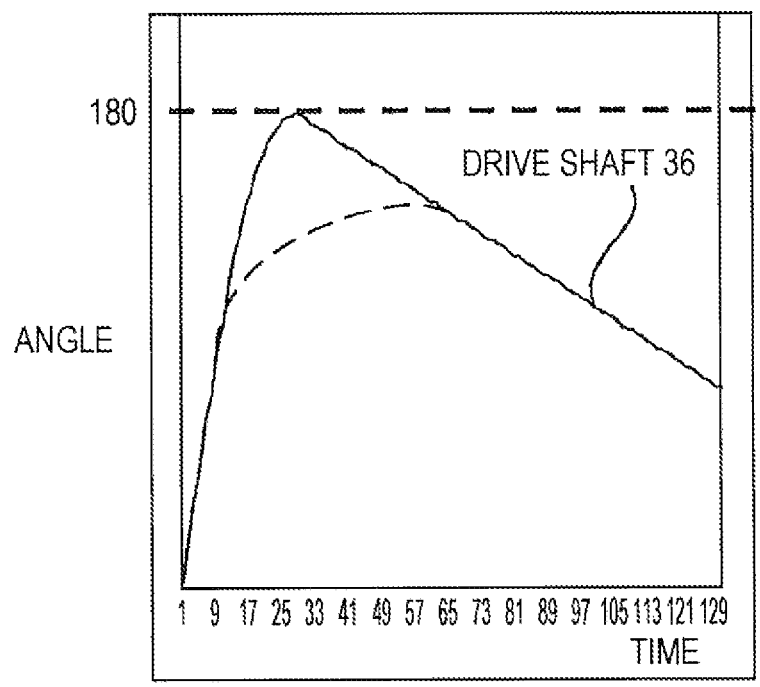
FIG. 8 is an explanatory view to explain a modification of a liner operation in the robot control process.

In particular, the control device 1 desirably controls the respective speeds of the drive shafts 34 to 36 such that the drive shafts 34 to 36 are stopped upon simultaneously reaching the angles to be taken at the work end point Q2. As a result, comparing with the case where respective drive motors of the drive shafts 34 to 36 are stopped at different times, vibrations, etc. generated upon stop of the drive motors can be suppressed more effectively. Furthermore, it is conceivable to modify the angles of the drive shafts 34 to 36 such that the respective speeds of the drive shafts 34 to 36 at the start of the linear operations thereof, i.e., at the time L2 at which the exception condition is satisfied, are moderated. FIG. 8 illustrates examples of angle change of the drive shaft 36 before and after the exception condition is satisfied. When, as depicted by a solid line in FIG. 8, the angle of the drive shaft 36 is increased up to 180 degrees and is then abruptly changed toward the minus side, an abrupt acceleration toward the minus side is exerted on the drive shaft 36, thus causing vibrations, etc. In consideration of the above point, as depicted by a broken line in FIG. 8, it is conceivable to previously estimate that the angle of the drive shaft 36 reaches an upper limit value 180 of the operation range thereof, and to modify the angle of the drive shaft 36 such that the angle of the drive shaft 36 is moderately changed toward the minus side without reaching the upper limit value 180. Such a modification can avoid an abrupt acceleration from being exerted on the drive shaft 36 immediately after the exception condition is satisfied, and can prevent vibrations, etc. As a matter of course, the above discussion is similarly applied to the drive shafts 34 and 35.

In addition, the above-described control method for preventing the abrupt stop of the drive shafts 34 to 36 and the abrupt acceleration exerted on them can be similarly applied to the cases where the other exception conditions in the above-described embodiment, EXAMPLE 2 described later, and so on are used.

Example 2

Another example of the above-described exception condition used in the robot control process (see FIG. 3) will be described in EXAMPLE 2.

Figure 9:
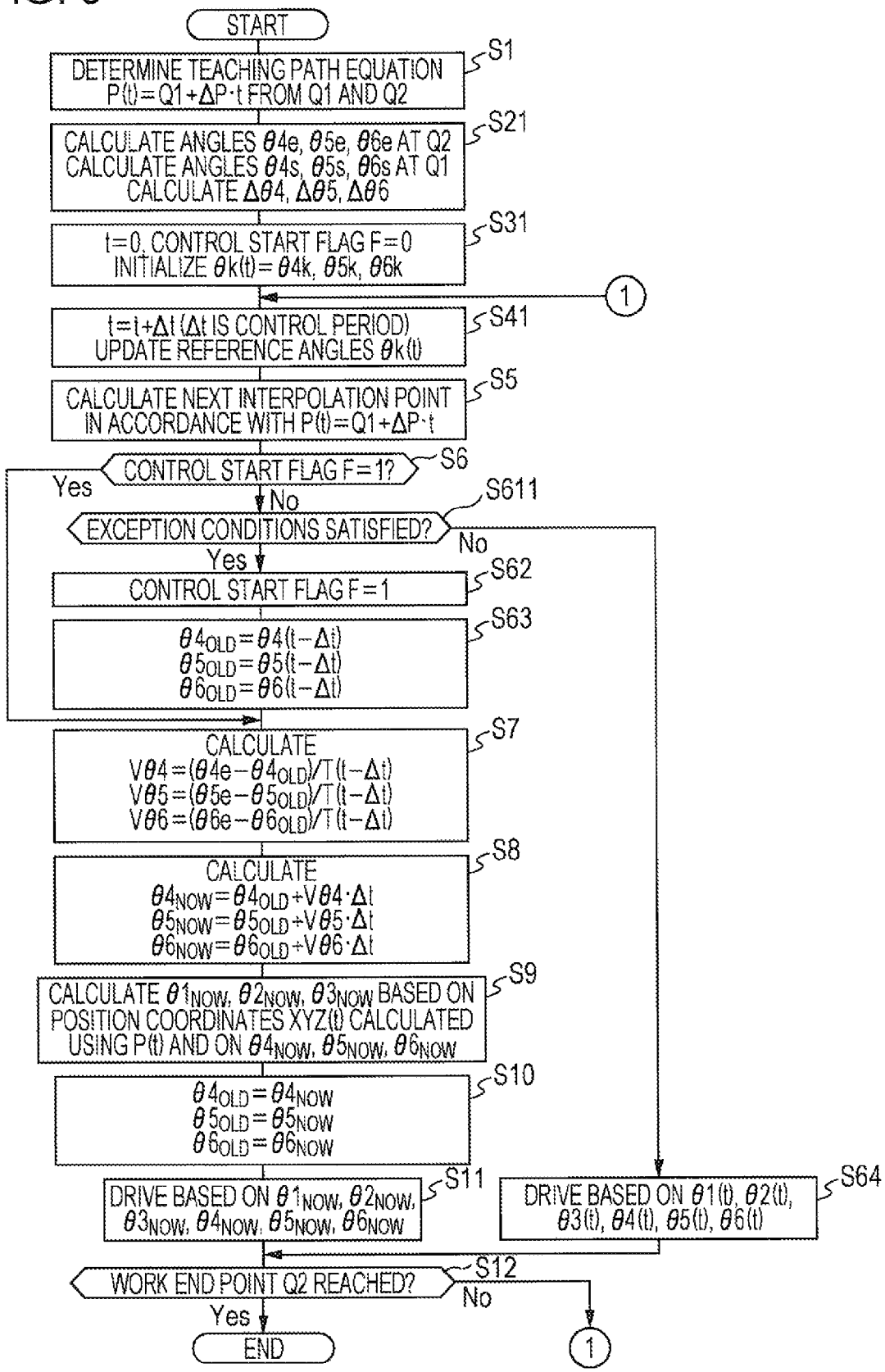
FIG. 9 is a flowchart illustrating one example of procedures of a robot control process according to EXAMPLE 2.

FIG. 9 is a flowchart illustrating one example of procedures of a robot control process according to EXAMPLE 2. It is to be noted that similar processing procedures to those in the above-described robot control process (see FIG. 3) are denoted by similar symbols and description thereof is omitted.

More specifically, as illustrated in FIG. 9, steps S21, S31, S41 and S611 described below are executed in the robot control process according to EXAMPLE 2 instead of above steps S2, S3, S4 and S61, respectively.

(Steps S21, S31 and S41)

In step S21, the control device 1 calculates not only the angles $\theta 4e$, $\theta 5e$ and $\theta 6e$ of the drive shafts 34 to 36 at the work end point Q2, but also the angles $\theta 4s$, $\theta 5s$ and $\theta 6s$ of the drive shafts 34 to 36 at the work start point Q1.

In step S21, the control device 1 further calculates respective angle variations $\Delta\theta 4$, $\Delta\theta 5$ and $\Delta\theta 6$ of the drive shafts 34 to 36 per unit time (1 msec) when the drive shafts 34 to 36 are linearly operated at constant speeds from the work start point Q1 to the work end point Q2. Assuming here that the remaining moving time of the end effector 2 at the work start point Q1 is T(s), the angle variations $\Delta\theta 4$, $\Delta\theta 5$ and $\Delta\theta 6$ can be calculated respectively in accordance with the following formulae (51) to (53):

$$\Delta\theta 4 = (\theta 4e - \theta 4s)/T(s) \tag{51}$$

$$\Delta\theta 5 = (\theta 5e - \theta 5s)/T(s) \tag{52}$$

$$\Delta\theta 6 = (\theta 6e - \theta 6s)/T(s) \tag{53}$$

Next, in step S31, the control device 1 initializes both the control time t and the control start flag F to 0, and further initializes reference angles $\theta k(t) = \{\theta 4k, \theta 5k, \theta 6k\}$ corresponding to the drive shafts 34 to 36. The reference angles $\theta k(t)$ are referred to when determining the exception condition in later-described step S611, and their initial values $\theta k(0)$ are set as $\{\theta 4k, \theta 5k, \theta 6k\} = \{\theta 4s, \theta 5s, \theta 6s\}$.

In step S41, the control device 1 updates the control time t (i.e., $t = t + \Delta t$) and further updates the reference angles $\theta k(t)$. More specifically, the reference angles $\theta k(t)$ are given as $\theta 4k = \theta 4k + \Delta\theta 4 \cdot \Delta t$, $\theta 5k = \theta 5k + \Delta\theta 5 \cdot \Delta t$, and $\theta 6k = \theta 6k + \Delta\theta 6 \cdot \Delta t$.

Stated in another way, the reference angles $\theta k(t)$ are determined based on the work start point Q1 and the work end point Q2, and are updated, at proper timings, to values on a linear line interconnecting the work start point Q1 and the work end point Q2. As another example, the reference angles $\theta k(t)$ may be the angles of the drive shafts 34 to 36 at the work start point Q1 or the work end point Q2.

(Step S611)

In the robot control process according to EXAMPLE 2, the control device 1 determines in an exception condition determining process in step S611 whether or not a differential angle between at least one of the angles $\theta 4(t)$, $\theta 5(t)$ and $\theta 6(t)$ of the drive shafts 34 to 36 of the first articulated drive system at the next interpolation point and corresponding one of the reference angles $\theta 4k$, $\theta 5k$ and $\theta 6k$ exceeds corresponding one of predetermined angles $\theta 4w$, $\theta 5w$ and $\theta 6w$ that are set in advance. The predetermined angles $\theta 4w$, $\theta 5w$ and $\theta 6w$ are set in advance to previously estimate whether or not there is a high possibility that the angles $\theta 4(t)$, $\theta 5(t)$ and $\theta 6(t)$ of the drive shafts 34 to 36 are too away from the reference angles $\theta 4k$, $\theta 5k$ and $\theta 6k$, and that the angles of the drive shafts 34 to 36 are abruptly changed in order to make the drive shafts 34 to 36 reach the work end point Q2. The predetermined angles $\theta 4w$, $\theta 5w$ and $\theta 6w$ may be set to, for example, 90 degrees, 180 degrees, and 90 degrees, respectively.

The control device 1 determines that the exception condition is satisfied, for example, when any of the following formulae (61) to (63) is held:

$$|\theta 4(t) - \theta 4k| > \theta 4w \tag{61}$$

$$|\theta 5(t) - \theta 5k| > \theta 5w \tag{62}$$

$$|\theta 6(t) - \theta 6k| > \theta 6w \tag{63}$$

Figure 10:
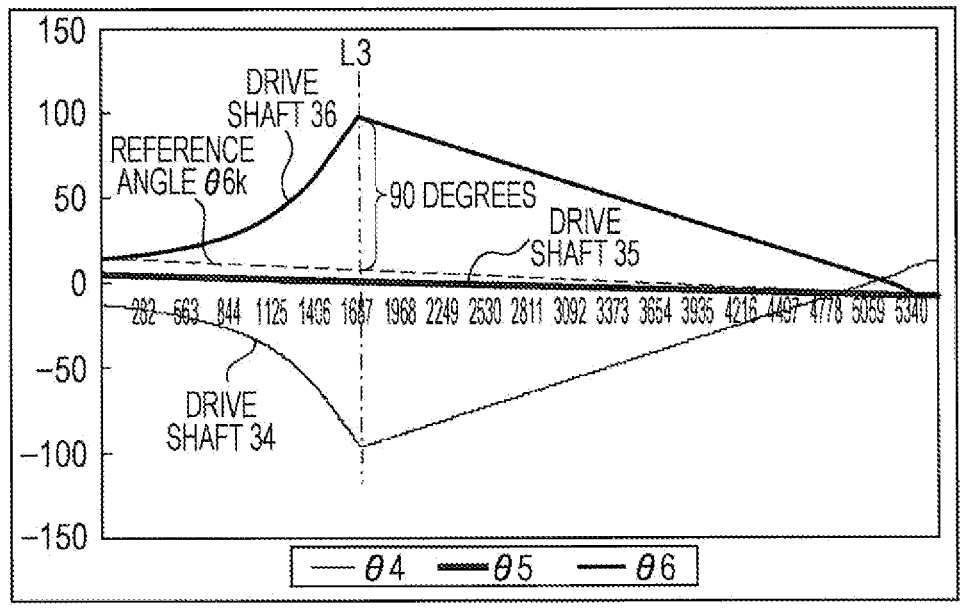
FIG. 10 illustrates an operation example of the drive shafts 34 to 36 when the robot control process according to EXAMPLE 2 is executed.

FIG. 10 illustrates an operation example when the signs of the angles of the drive shaft 35 at the work start point Q1 and the work end point Q2 are different from each other, and it represents the execution result of the robot control process according to EXAMPLE 2. More specifically, the angle $\theta 5s$ of the drive shaft 35 at the work start point Q1 is +10 degrees, and the angle $\theta 5e$ of the drive shaft 35 at the work end point Q2 is −10 degrees. The following description is made, for example, in connection with an example where the angle $\theta 6(t)$ of the drive shaft 36 deviates from the reference angle $\theta 6k(t)$ by 90 degrees on an assumption that the predetermined angle $\theta 6w$ is set to 90 degrees. As a matter of course, the following description is similarly applied to the drive shafts 34 and 35.

As illustrated in FIG. 10, when the robot control process according to EXAMPLE 2 is executed, the drive shafts 31 to 36 are driven after a time L3, at which the angle $\theta 6(t)$ of the drive shaft 36 at the next interpolation point is determined as being away from the reference angle $\theta 6k(t)$ by 90 degrees or more, such that the angles of the drive shafts 34 to 36 are linearly changed toward the angles to be taken at the work start point Q2. Therefore, the drive shafts 34 to 36 can be made to reliably reach the angles to be taken at the work start point Q2. In particular, with the robot control process according to EXAMPLE 2, the drive shafts 34 to 36 can be linearly operated toward the work end point Q2 in an earlier stage before the angles of the drive shafts 34 to 36 become too away from the reference angles $\theta k(t)$. Thus, abrupt variations of the angles of the drive shafts 34 to 36 can be prevented.

The control device 1 is just required to determine whether or not at least one of the plural exception conditions described in the above embodiment, EXAMPLE 1, and EXAMPLE 2 is satisfied. However, it is also conceivable to simultaneously monitor whether or not the plural exception conditions are satisfied, and to execute the linearly moving process subsequent to above step S7 when any one of the exception conditions is satisfied. This enables the advantages of the above embodiment, EXAMPLE 1, and EXAMPLE 2 to be obtained together.

Example 3

EXAMPLE 3 is intended to execute copying control in which the control device 1 controls the articulated robot 3 in such a manner that the end effector 2 is moved to trace a work line of a workpiece. In this case, a sensor (corresponding to deviation amount detecting means) for detecting a deviation amount $\Delta XYZ\alpha\beta\gamma(t)$ between the end effector 2 and the work line is disposed on the articulated robot 3.

Herein, the deviation amount $\Delta XYZ\alpha\beta\gamma(t)$ detected by the sensor at each detection time is a value represented on the basis of the interpolation point at the relevant detection time, which is calculated using the above-described path equation P(t). The control device 1 executes the copying control for moving the end effector 2 to trace the work line based on the detection result of the sensor. The control device 1 in executing the copying control corresponds to copying control means.

In more detail, when calculating the next interpolation point in step S5 of the above-described robot control process (see FIG. 3), the control device 1 adds the deviation amount $\Delta XYZ\alpha\beta\gamma(t)$, currently detected by the sensor, to the path equation P(t). Furthermore, the control device 1 finds the solution of the inverse kinematic problem from a position and attitude X'Y'Z'α'β'γ'(t) of the end effector 2 at the interpolation point after the above-described addition, thereby calculating respective angles θ1'(t) to θ6'(t) of the drive shafts 31 to 36 at the next interpolation point. If the above-described exception condition is not satisfied, the control device 1 drives the drive shafts 31 to 36 in above step S64 based on the angles θ1'(t) to θ6'(t) after being corrected using the deviation amount $\Delta XYZ\alpha\beta\gamma(t)$.

Moreover, in above step S5, the control device 1 updates the work end point Q2 to a value resulting from adding the deviation amount $\Delta XYZ\alpha\beta\gamma(t)$ to the work end point Q2. On that occasion, the respective angles of the drive shafts 34 to 36 at the work end point Q2 after the update are set as θ4e(t), θ5e(t) and θ6e(t). Herein, the control device 1 in executing the above-mentioned process corresponds to work end point updating means.

Accordingly, in the process of determining the exception condition, whether or not the exception condition is satisfied is determined based on the work end point Q2 after the update. For example, the above-mentioned formulae (11) to (13) representing indices for determining the exception condition in step S61 in the foregoing embodiment are modified to the following formulae (11') to (13'), respectively:

$$|(\theta 4e(t)-\theta 4(t))/T(t)|>\theta 4d \tag{11'}$$

$$|(\theta 5e(t)-\theta 5(t))/T(t)|>\theta 5d \tag{12'}$$

$$|(\theta 6e(t)-\theta 6(t))/T(t)|>\theta 6d \tag{13'}$$

Furthermore, the above-mentioned formulae (21) to (23) for calculating the speeds Vθ4, Vθ5 and Vθ6 in step S7 are modified to the following formulae (21') to (23'), respectively. Stated in another way, in the above-described driving process in step S11, the process of linearly operating the drive shafts 34 to 36 is executed with the work end point Q2 after the update being a target.

$$V\theta 4=(\theta 4e(t)-\theta 4_{OLD})/T(t-\Delta t) \tag{21'}$$

$$V\theta 5=(\theta 5e(t)-\theta 5_{OLD})/T(t-\Delta t) \tag{22'}$$

$$V\theta 6=(\theta 6e(t)-\theta 6_{OLD})/T(t-\Delta t) \tag{23'}$$

As a result, when the copying control is executed based on the deviation amount detected by the sensor, the respective angles of the drive shafts 34 to 36 can be made to reliably reach the angles to be taken at the work end point Q2 after being corrected with the copying control.

Figure 11:
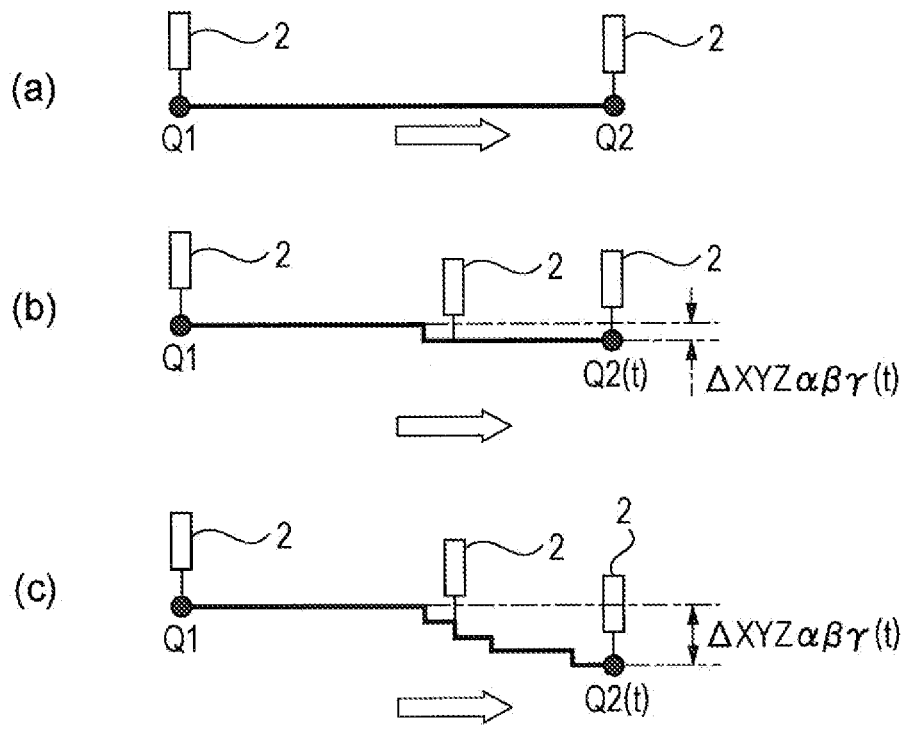
FIG. 11 illustrates an operation example of an end effector 2 when copying control and the robot control process are both executed.

More specifically, as illustrated in FIGS. 11(a) to 11(c), when the end effector 2 is moved from the work start point Q1 to the work end point Q2 and the deviation amount $\Delta XYZ\alpha\beta\gamma$(t) is corrected with the copying control, the work end point Q2 is updated to the work end point Q2(t) with the addition of the deviation amount $\Delta XYZ\alpha\beta\gamma(t)$. With that update, the respective angles of the drive shafts 34 to 36 can be made to reach the angles to be taken at the work end point Q2(t).

Example 4

It is not desired that, in the above-described robot control process (see FIG. 3), the attitude of the end effector 2 is not taken into consideration at all. In view of such a point, EXAMPLE 4 is described in connection with the scheme capable of suppressing variations of a predetermined particular component in the attitude of the end effector 2.

More specifically, in EXAMPLE 4, the control device 1 executes a particular component suppressing process (see FIG. 12), described later, between step S8 and step S9 in the robot control process (see FIG. 3). It is to be noted that the robot control process is not limited to the process described in the foregoing embodiment, and any of the robot control processes described in EXAMPLES 1 to 3 may also be employed.

Figure 12:
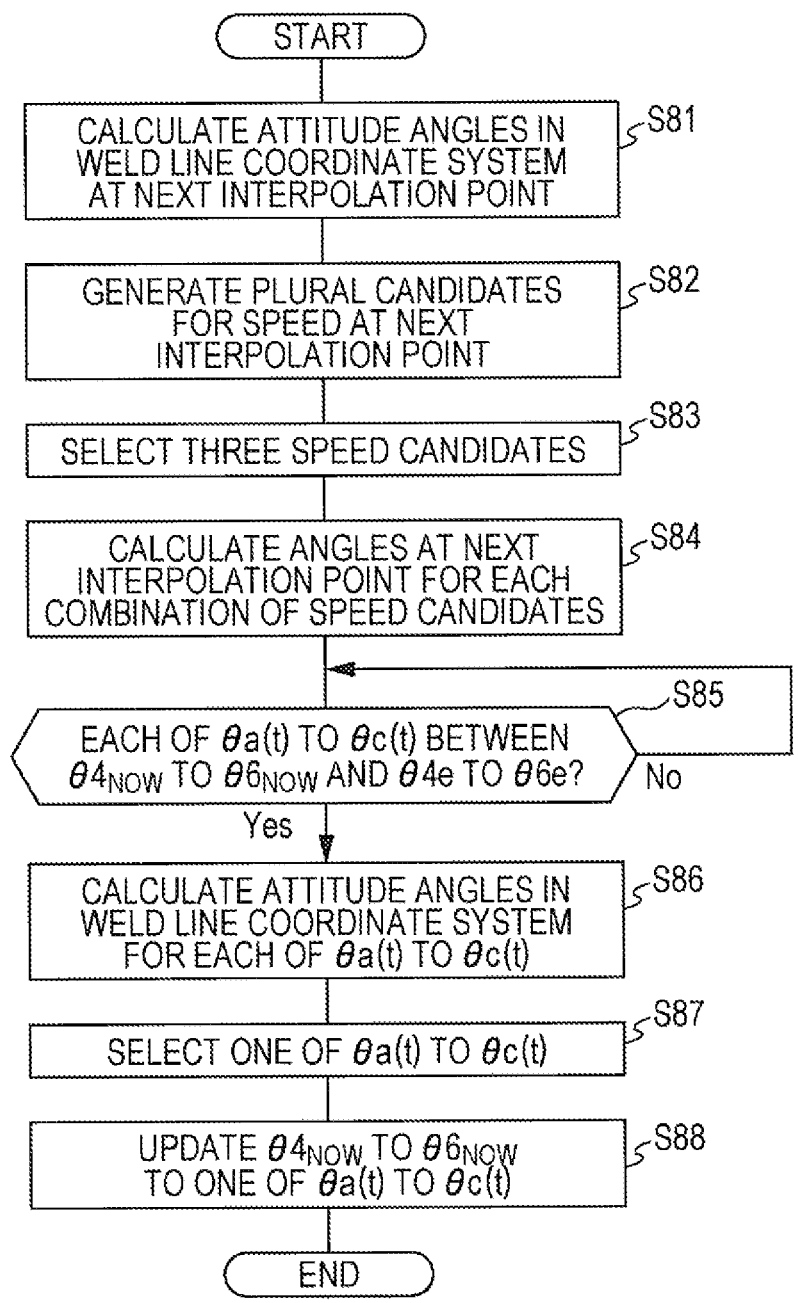
FIG. 12 is a flowchart illustrating one example of procedures of a particular component suppressing process.

One example of procedures of the particular component suppressing process executed by the control device 1 will be described below with reference to a flowchart of FIG. 12.
(Step S81)

Figure 13:
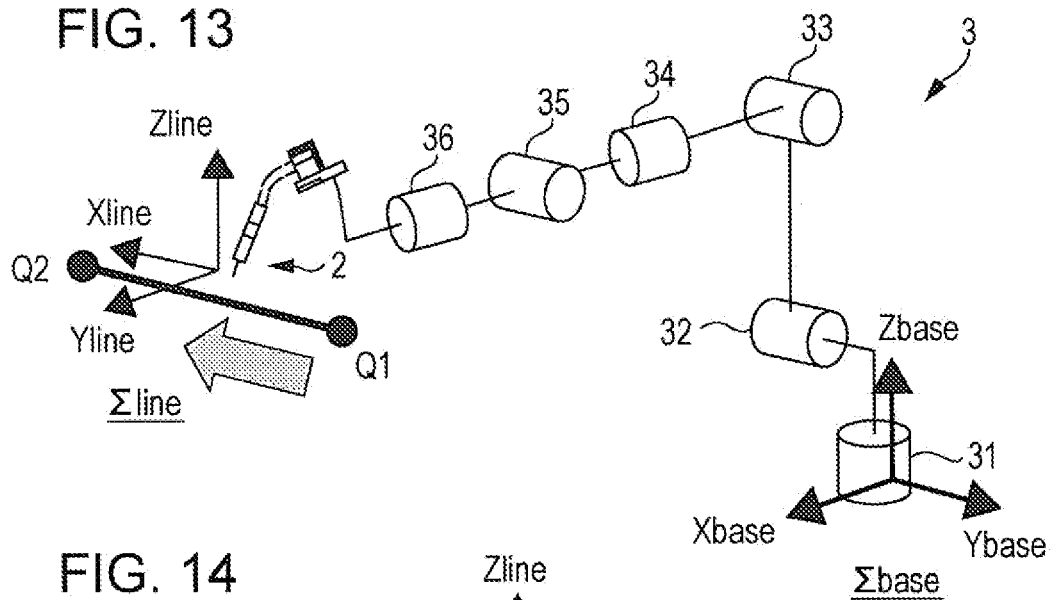
FIG. 13 is an explanatory view to explain a weld line coordinate system Σline.
Figure 14:
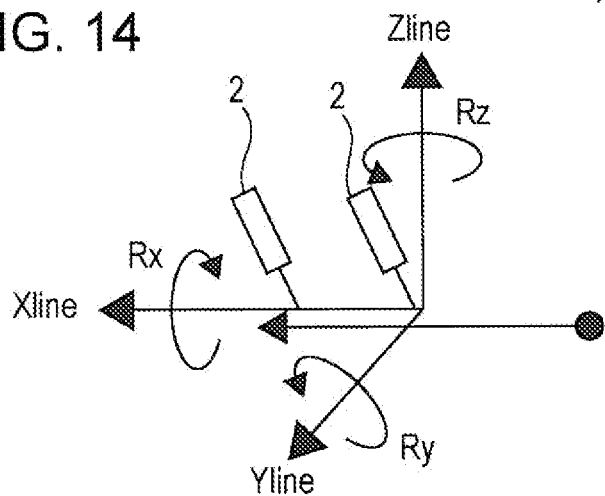
FIG. 14 is an explanatory view to explain the weld line coordinate system Σline.
Figure 15:
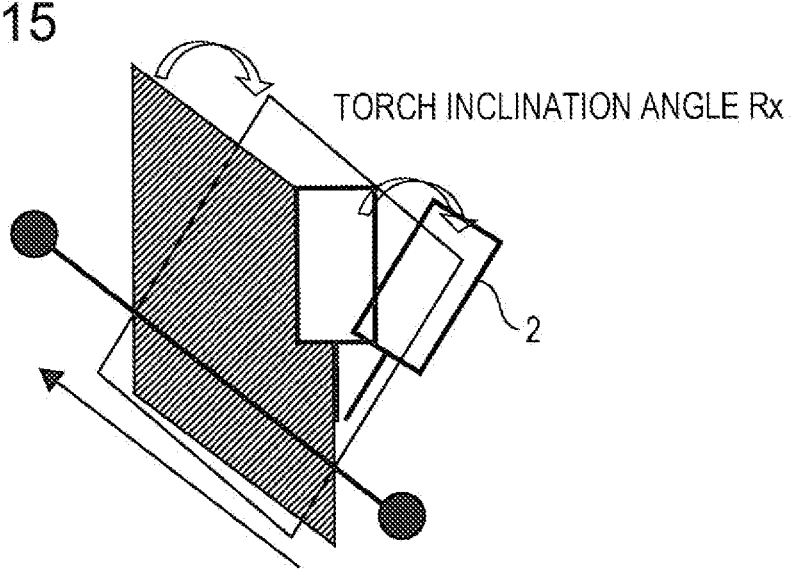
FIG. 15 is an explanatory view to explain the weld line coordinate system Σline.
Figure 16:
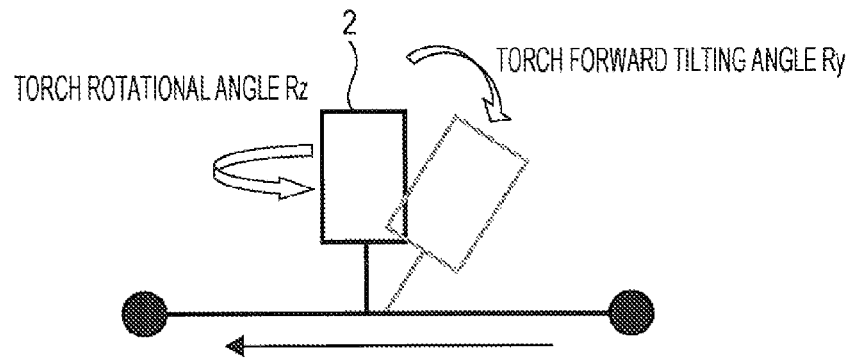
FIG. 16 is an explanatory view to explain the weld line coordinate system Σline.

First, in step S81, the control device 1 calculates, for the next interpolation point, attitude angles of the end effector 2 in a work coordinate system (hereinafter referred to as a "weld line coordinate system Σline") in which an axis in a moving direction (advancing direction) of the end effector 2 is defined as an X-axis, an axis represented by the outer product of the X-axis and the direction of gravity (i.e., X-axis×direction of gravity) is defined as a Y-axis, and an axis represented by the outer product of the X-axis and the Y-axis (i.e., X-axis× Y-axis) is defined as a Z-axis as illustrated in FIG. 13. Herein, the attitude angles of the end effector 2 in the weld line coordinate system Σline are expressed, as illustrated in FIGS. 14 to 16, by a torch inclination angle Rx that is a rotational angle about the X-axis, a torch forward tilting angle Ry that is a rotational angle about the Y-axis, and a torch rotational angle Rz that is a rotational angle about the Z-axis.

In more detail, the control device 1 converts the position and attitude $XYZ\alpha\beta\gamma(t)$ in the above-described base coordinate system Σbase at the next interpolation point, which has been calculated in above step S5, to the attitude angles (i.e., the torch inclination angle Rx, the torch forward tilting angle Ry, and the torch rotational angle Rz) in the weld line coordinate system Σline.

The conversion from the base coordinate system Σbase to the weld line coordinate system Σline is performed, for example, in accordance with the following formulae (101) to (107). Respective unit vectors in the X-axis, the Y-axis, and the Z-axis in the weld line coordinate system Σline are denoted by Xm, Ym, and Zm, respectively.

$$^{line}R_{tool} = \begin{bmatrix} 1 & 0 & 0 \\ 0 & \cos Rx & -\sin Rx \\ 0 & \sin Rx & \cos Rx \end{bmatrix} \begin{bmatrix} \cos Ry & 0 & \sin Ry \\ 0 & 1 & 0 \\ -\sin Ry & 0 & \cos Ry \end{bmatrix} \begin{bmatrix} \cos Rz & -\sin Rz & 0 \\ \sin Rz & \cos Rz & 0 \\ 0 & 0 & 1 \end{bmatrix} == \quad (101)$$

$$\begin{bmatrix} \cos Ry \cos Rz & -\cos Ry \sin Rz & \sin Ry \\ \sin Rx \sin Ry \cos Rz + \cos Rx \sin Rz & -\sin Rx \sin Ry \sin Rz - \cos Rx \cos Rz & -\sin Rx \cos Ry \\ -\cos Rx \sin Ry \cos Rz + \sin Rx \sin Rz & \cos Rx \sin Ry \sin Rz + \sin Rx \cos Rz & \cos Rx \cos Ry \end{bmatrix}$$

$$^{base}R_{tool} = \begin{bmatrix} \cos\alpha & -\sin\alpha & 0 \\ \sin\alpha & \cos\alpha & 0 \\ 0 & 0 & 1 \end{bmatrix} \begin{bmatrix} \cos\beta & 0 & \sin\beta \\ 0 & 1 & 0 \\ -\sin\beta & 0 & \cos\beta \end{bmatrix} \begin{bmatrix} 1 & 0 & 0 \\ 0 & \cos\gamma & -\sin\gamma \\ 0 & \sin\gamma & \cos\gamma \end{bmatrix} \quad (102)$$

$$^{base}R_{line} = \begin{bmatrix} Xm[x] & Ym[x] & Zm[x] \\ Xm[y] & Ym[y] & Zm[y] \\ Xm[z] & Ym[z] & Zm[z] \end{bmatrix} \quad (103)$$

$$^{line}R_{tool} = {}^{line}R_{base} \cdot {}^{base}R_{tool} = {}^{base}R_{line}^T \cdot {}^{base}R_{tool} = \begin{bmatrix} Rm11 & Rm12 & Rm13 \\ Rm21 & Rm22 & Rm23 \\ Rm31 & Rm32 & Rm33 \end{bmatrix} \quad (104)$$

$$Rx = a\tan(Rm23/Rm33) \quad (105)$$

$$Ry = a\sin(Rm13) \quad (106)$$

$$Rz = a\tan(Rm12/Rm11) \quad (107)$$

(Step S82)

Next, in step S82, the control device 1 generates plural candidates of speeds at the next interpolation point for each of the drive shafts 34 to 36 on the basis of the speeds of the drive shafts 34 to 36 in the preceding control period. Herein, the control device 1 in executing the above-mentioned process corresponds to an angle candidate calculating means.

For example, assuming that the respective speeds of the drive shafts 34 to 36 in the preceding control period are $V\theta4_{OLD}$, $V\theta5_{OLD}$ and $V\theta6_{OLD}$, the control device 1 generates $V\theta4m=V\theta4_{OLD}-F$, $V\theta4n=V\theta4_{OLD}$, and $V\theta4p=V\theta4_{OLD}+F$ as candidates for the speed of the drive shaft 34. Similarly, the control device 1 generates $V\theta5m=V\theta_{OLD}-G$, $V\theta5n=V\theta5_{OLD}$, and $V\theta5p=V\theta5_{OLD}+G$ as candidates for the speed of the drive shaft 35, and further generates $V\theta6m=V\theta6_{OLD}-H$, $V\theta6n=V\theta6_{OLD}$, and $V\theta6p=V\theta6_{OLD}+H$ as candidates for the speed of the drive shaft 36. Herein, the constants F, G and H are each preset as a value within the range where, for example, an acceleration per sampling period does not exceed a limit value and vibrations do not occur.

By generating three speed candidates for each of the drive shafts 34 to 36 as mentioned above, twenty-seven different combinations, expressed by the following (201) to (227), are obtained in total.

(201): Vθ4m, Vθ5m, Vθ6m
(202): Vθ4m, Vθ5m, Vθ6n
(203): Vθ4m, Vθ5m, Vθ6p
(204): Vθ4m, Vθ5n, Vθ6m
(205): Vθ4m, Vθ5n, Vθ6n
(206): Vθ4m, Vθ5n, Vθ6p
(207): Vθ4m, Vθ5p, Vθ6m
(208): Vθ4m, Vθ5p, Vθ6n
(209): Vθ4m, Vθ5p, Vθ6p
(210): Vθ4n, Vθ5m, Vθ6m
(211): Vθ4n, Vθ5m, Vθ6n
(212): Vθ4n, Vθ5m, Vθ6p
(213): Vθ4n, Vθ5n, Vθ6m
(214): Vθ4n, Vθ5n, Vθ6n
(215): Vθ4n, Vθ5n, Vθ6p
(216): Vθ4n, Vθ5p, Vθ6m
(217): Vθ4n, Vθ5p, Vθ6n
(218): Vθ4n, Vθ5p, Vθ6p
(219): Vθ4p, Vθ5m, Vθ6m
(220): Vθ4p, Vθ5m, Vθ6n
(221): Vθ4p, Vθ5m, Vθ6p
(222): Vθ4p, Vθ5n, Vθ6m
(223): Vθ4p, Vθ5n, Vθ6n
(224): Vθ4p, Vθ5n, Vθ6p
(225): Vθ4p, Vθ5p, Vθ6m
(226): Vθ4p, Vθ5p, Vθ6n
(227): Vθ4p, Vθ5p, Vθ6p (Steps S83 to S84)

Next, in step S83, the control device 1 selects three among the above-mentioned combinations (201) to (227) at random or in accordance with a preset rule. The three speed candidates selected at this time are assumed to be Vθa(t), Vθb(t) and Vθc(t).

In step S84, the control device 1 generates candidates θa(t), θb(t) and θc(t) for the angles of the drive shafts 34 to 36 at the next interpolation point when the three speed candidates Vθa (t), Vθb(t) and Vθc(t) are each employed. While the three speed candidates and the three angle candidates are generated here for convenience of explanation, the number of candidates may be optionally set depending on the computing capability of the control device 1 within the range where the operating speed required for the articulated robot 3 is satisfied.

For example, when the above-mentioned combinations (201), (202) and (203) are selected respectively as the speed candidates Vθa(t), Vθb(t) and Vθc(t) in the first sampling period as expressed by the following (301) to (303), the angle candidates θa(t), θb(t) and θc(t) are generated as expressed by the following (304) to (306).

$$V\theta a(t)=V\theta 4a(t), V\theta 5a(t), V\theta 6a(t)=V\theta 4m, V\theta 5m, V\theta 6m \quad (301)$$

$$V\theta b(t)=V\theta 4b(t), V\theta 5b(t), V\theta 6b(t)=V\theta 4m, V\theta 5m, V\theta 6n \quad (302)$$

$$V\theta c(t)=V\theta 4c(t), V\theta 5c(t), V\theta 6c(t)=V\theta 4m, V\theta 5m, V\theta 6p \quad (303)$$

$$\theta a(t)=\theta 4a(t), \theta 5a(t), \theta 6a(t)=\theta 4_{OLD}+V\theta 4a(t)\cdot\Delta t, \theta 5_{OLD}+ \\ V\theta 5a(t)\cdot\Delta t, \theta 6_{OLD}+V\theta 6a(t)\cdot\Delta t \quad (304)$$

$$\theta b(t)=\theta 4b(t), \theta 5b(t), \theta 6b(t)=\theta 4_{OLD}+V\theta 4b(t)\cdot\Delta t, \theta 5_{OLD}+ \\ V\theta 5b(t)\cdot\Delta t, \theta 6_{OLD}+V\theta 6b(t)\cdot\Delta t \quad (305)$$

$$\theta c(t)=\theta 4c(t), \theta 5c(t), \theta 6c(t)=\theta 4_{OLD}+V\theta 4c(t)\cdot\Delta t, \theta 5_{OLD}+ \\ V\theta 5c(t)\cdot\Delta t, \theta 6_{OLD}+V\theta 6c(t)\cdot\Delta t \quad (306)$$

Similarly, when the above-mentioned combinations (203), (206) and (209) are selected respectively as the speed candidates $V\theta a(t)$, $V\theta b(t)$ and $V\theta c(t)$ in the next sampling period as expressed by the following (311) to (313), the angle candidates $\theta a(t)$, $\theta b(t)$ and $\theta c(t)$ are also generated.

$$V\theta a(t)=V\theta 4a(t), V\theta 5a(t), V\theta 6a(t)=V\theta 4m, V\theta 5m, V\theta 6p \quad (311)$$

$$V\theta b(t)=V\theta 4b(t), V\theta 5b(t), V\theta 6b(t)=V\theta 4m, V\theta 5n, V\theta 6p \quad (312)$$

$$V\theta c(t)=V\theta 4c(t), V\theta 5c(t), V\theta 6c(t)=V\theta 4m, V\theta 5p, V\theta 6p \quad (313)$$

Thereafter, similarly, when the above-mentioned combinations (209), (218) and (227) are selected respectively as the speed candidates $V\theta a(t)$, $V\theta b(t)$ and $V\theta c(t)$ in the further next sampling period as expressed by the following (321) to (323), the angle candidates $\theta a(t)$, $\theta b(t)$ and $\theta c(t)$ are also generated.

$$V\theta a(t)=V\theta 4a(t), V\theta 5a(t), V\theta 6a(t)=V\theta 4m, V\theta 5p, V\theta 6p \quad (321)$$

$$V\theta b(t)=V\theta 4b(t), V\theta 5b(t), V\theta 6b(t)=V\theta 4n, V\theta 5p, V\theta 6p \quad (322)$$

$$V\theta c(t)=V\theta 4c(t), V\theta 5c(t), V\theta 6c(t)=V\theta 4p, V\theta 5p, V\theta 6p \quad (323)$$

(Step S85)

In step S85, the control device 1 determines whether or not the angle candidates are within the ranges nearer to the targets than the angles taken when the drive shafts 34 to 36 of the first articulated drive system are linearly operated with the angles to be taken at the work end point Q2 being the targets. Stated in another way, it is determined whether or not the angle candidates $\theta a(t)$, $\theta b(t)$ and $\theta c(t)$ calculated in above step S84 are present between the angles $\theta 4_{NOW}$, $\theta 5_{NOW}$ and $\theta 6_{NOW}$ calculated in above step S8 and the angles $\theta 4e$, $\theta 5e$ and $\theta 6e$ calculated in above step S2.

If it is determined that the angle candidates $\theta a(t)$, $\theta b(t)$ and $\theta c(t)$ are each present between the angles $\theta 4_{NOW}$, $\theta 5_{NOW}$ and $\theta 6_{NOW}$ and the angles $\theta 4e$, $\theta 5e$ and $\theta 6e$ (Yes side of S85), the process is shifted to step S86. However, if it is determined not so (No side of S85), the process is returned to above step S83 in which another different combination is selected. Then, the angle candidates $\theta a(t)$, $\theta b(t)$ and $\theta c(t)$ are generated in above step S84 again.

Thus, since the respective angle candidates for the drive shafts 34 to 36 are always restricted to fall within the ranges between the angles $\theta 4_{NOW}$, $\theta 5_{NOW}$ and $\theta 6_{NOW}$ and the angles $\theta 4e$, $\theta 5e$ and $\theta 6e$, the respective angles of the drive shafts 34 to 36 can be made to reliably reach the angles to be taken at the work end point Q2. There is a possibility that the respective angles of the drive shafts 34 to 36 may reach the angles to be taken at the work end point Q2 in a position before the work end point Q2. In such a case, the respective angles of the drive shafts 34 to 36 may be set as $\theta 4_{NOW}=\theta 4e$, $\theta 5_{NOW}=\theta 5e$, and $\theta 6_{NOW}=\theta 6e$ after that. Herein, the control device 1 in calculating plural angle candidates in above steps S82 to S85 corresponds to angle candidate calculating means.

(Step S86)

Next, in step S86, the control device 1 calculates the attitude angles of the end effector 2, as viewed from the weld line coordinate system $\Sigma$line, for each of the angle candidates $\theta a(t)$, $\theta b(t)$ and $\theta c(t)$ generated in above step S84.

More specifically, the control device 1 may find the solution of a forward kinematic problem for each of the angle candidates $\theta a(t)$, $\theta b(t)$ and $\theta c(t)$, thereby calculating the corresponding position and attitude in the base coordinate system $\Sigma$base for each candidate, and then may execute conversion from the base coordinate system $\Sigma$base to the weld line coordinate system $\Sigma$line. It is to be noted that since the conversion from the base coordinate system $\Sigma$base to the weld line coordinate system $\Sigma$line can be executed in the same manner as in above step S81, description of the conversion is omitted here.

(Steps S87 to S88)

In step S87, the control device 1 selects one of the angle candidates $\theta a(t)$, $\theta b(t)$ and $\theta c(t)$, at which the attitude angles calculated in above step S86 are closest to the attitude angles calculated in above step S81. At that time, the control device 1 selects the angle candidate at which the attitude angle calculated in above step S86 is closest to the attitude angle calculated in above step S81 when variations of preset one or two of the three components (i.e., the torch inclination angle Rx, the torch forward tilting angle Ry, and the torch rotational angle Rz) of the attitude angles of the end effector 2 as viewed from the weld line coordinate system $\Sigma$line are suppressed. Herein, the control device 1 in executing the above-mentioned process corresponds to angle selecting means. The one or two particular components are preset by the control device 1 with user's manipulations made on the operating unit 13 or depending on the type of work to be performed by the articulated robot 3.

More specifically, the control device 1 calculates, in accordance with the following formulae (331) to (333), differential variations Ua, Ub and Uc between the angle attitudes when the angle candidates $\theta a(t)$, $\theta b(t)$ and $\theta c(t)$ are selected and the attitude angles calculated in above step S81, respectively. In the following formulae, constants D, E and F are numerical values set depending on which one(s) of the three components (i.e., the torch inclination angle Rx, the torch forward tilting angle Ry, and the torch rotational angle Rz) of the attitude angles of the end effector 2 is to be suppressed in variations. For example, when variations of the torch inclination angle Rx and the torch forward tilting angle Ry are to be suppressed, those constants may be set to D=1, E=1, and F=0.

$$Ua=D(Rx-Rxa)^2+E(Ry-Rya)^2+F(Rz-Rza)^2 \quad (331)$$

$$Ub=D(Rx-Rxb)^2+E(Ry-Ryb)^2+F(Rz-Rzb)^2 \quad (332)$$

$$Uc=D(Rx-Rxc)^2+E(Ry-Ryc)^2+F(R-Rzc) \quad (333)$$

Moreover, the control device 1 selects one of the angle candidates $\theta a(t)$, $\theta b(t)$ and $\theta c(t)$ corresponding to one of the differential variations Ua, Ub and Uc, which has the smallest value, i.e., corresponding to the smallest variation of the particular component(s) with respect to the attitude angles calculated in above step S81.

Thereafter, in step S88, the control device 1 changes $\theta 4_{NOW}$, $\theta 5_{NOW}$ and $\theta 6_{NOW}$, calculated in above step S8, to values given by one of the angle candidates $\theta a(t)$, $\theta b(t)$ and $\theta c(t)$ calculated in above step S87. In the case of Ua<Ub<Uc, for example, the angle candidate $\theta a(t)$ corresponding to the differential variation Ua is selected, whereby $\theta 4_{NOW}=\theta 4a(t)$, $\theta 5_{NOW}=\theta 5a(t)$, and $\theta 6_{NOW}=\theta 6a(t)$ are set.

As a result, it is possible to suppress variations of the particular component(s) of the end effector 2 when the drive shafts 31 to 36 are driven in subsequent steps S9 to S11.

Figure 17:
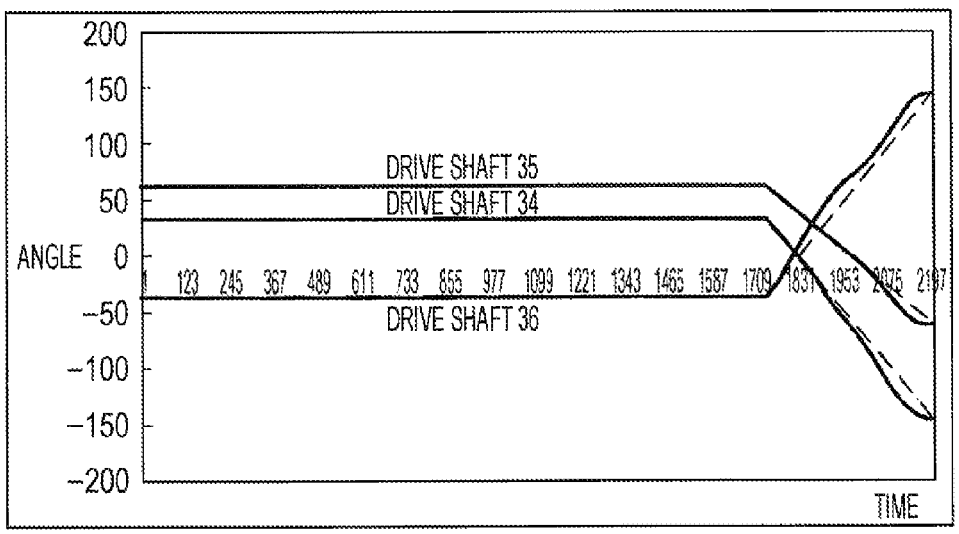
FIG. 17 is an explanatory view to explain the execution result of the particular component suppressing process.

FIG. 17 illustrates the loci in driving of the drive shafts 34 to 36 when the particular component suppressing process is executed in the robot control process (FIG. 3) in the above-described embodiment.

It is to be noted that broken lines in FIG. 17 represent the loci in driving of the drive shafts 34 to 36 when the drive shafts 34 to 36 are linearly operated without executing the particular component suppressing process.

The following is assumed here. The type of work performed by the articulated robot 3 is welding. It is particularly important to suppress variations of the torch inclination angle Rx and the torch forward tilting angle Ry among the attitude angles (i.e., the torch inclination angle Rx, the torch forward tilting angle Ry, and the torch rotational angle Rz) of the end effector 2 in the weld line coordinate system Σline. Hence the torch inclination angle Rx and the torch forward tilting angle Ry are preset as the particular components.

In such a case, after the above-described exception condition is satisfied, the drive shafts 34 to 36 are substantially linearly operated with the work end point Q2 being the target. With the execution of the particular component suppressing process (see FIG. 12), however, respective paths of the drive shafts 34 to 36 are finely adjusted, as illustrated in FIG. 17, to suppress the variations of the torch inclination angle Rx and the torch forward tilting angle Ry of the end effector 2 in the weld line coordinate system Σline.

Figure 18:
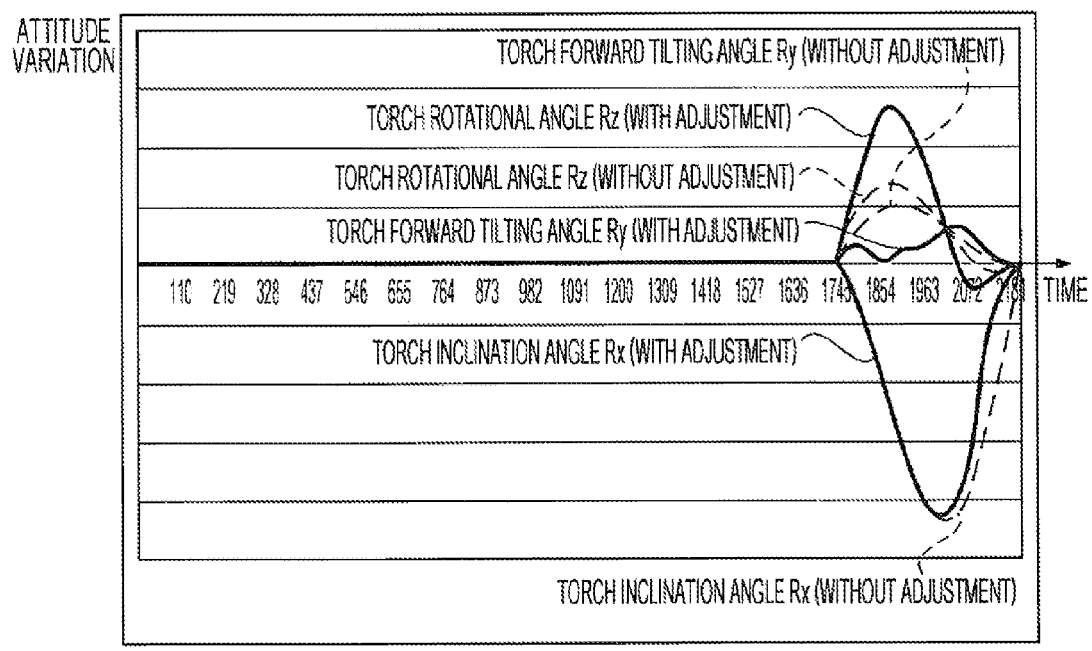
FIG. 18 is an explanatory view to explain the execution result of the particular component suppressing process.

Thus, as illustrated in FIG. 18, variations of the torch inclination angle Rx and the torch forward tilting angle Ry, which are important for the welding work (i.e., which have relatively large weights), can be suppressed with the sacrifice of variations of the torch rotational angle Rz, which is less important for the welding work (i.e., which has relatively small weight). It is to be noted that broken lines in FIG. 18 represent variations when the drive shafts 34 to 36 are linearly operated without executing the particular component suppressing process.

Figure 19:
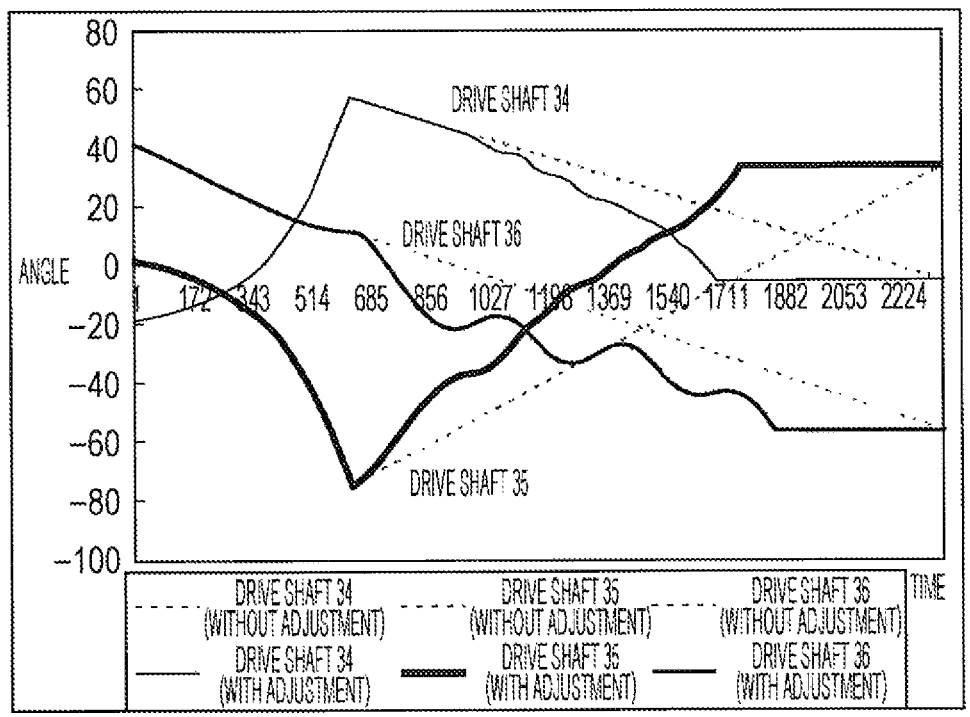
FIG. 19 is an explanatory view to explain the execution result of the particular component suppressing process.

FIG. 19 illustrates the loci in driving of the drive shafts 34 to 36 when the particular component suppressing process is executed in the robot control process (FIG. 9) in EXAMPLE 2. It is to be noted that broken lines in FIG. 19 represent the loci in driving of the drive shafts 34 to 36 when the drive shafts 34 to 36 are linearly operated without executing the particular component suppressing process.

Herein, it is also assumed that the type of work performed by the articulated robot 3 is welding, and that the torch inclination angle Rx and the torch forward tilting angle Ry are preset as the particular components.

In such a case, after the above-described exception condition is satisfied, the drive shafts 34 to 36 are substantially linearly operated with the work end point Q2 being the target. With the execution of the particular component suppressing process (see FIG. 12), however, respective paths of the drive shafts 34 to 36 are finely adjusted, as illustrated in FIG. 19, to suppress the variations of the torch inclination angle Rx and the torch forward tilting angle Ry of the end effector 2 in the weld line coordinate system Σline.

Figure 20:
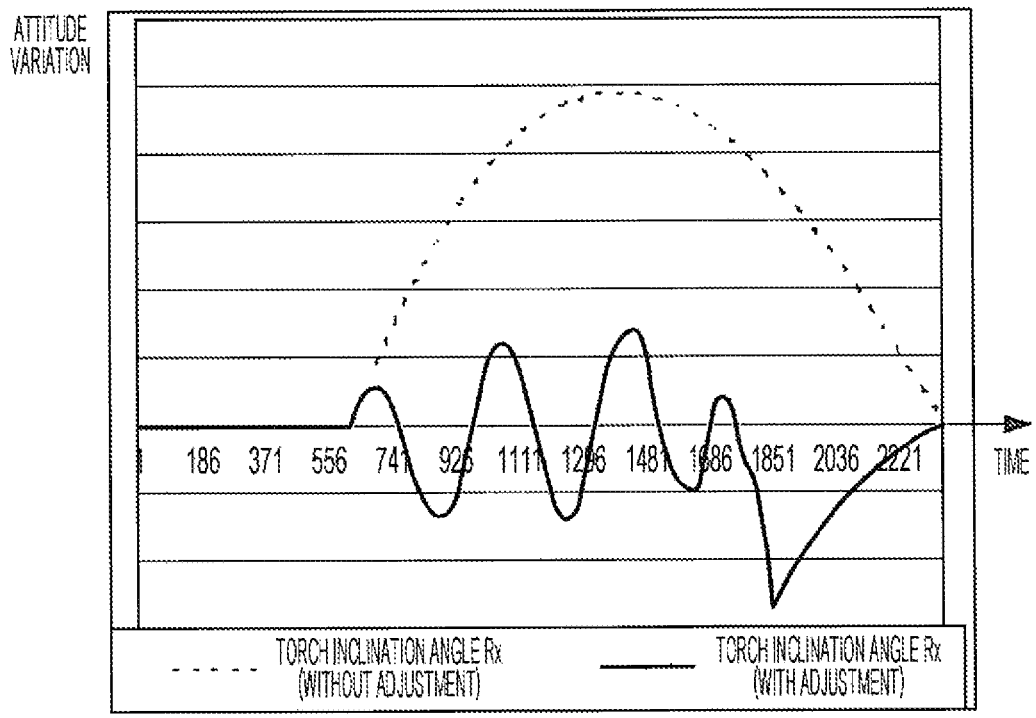
FIG. 20 is an explanatory view to explain the execution result of the particular component suppressing process.
Figure 21:
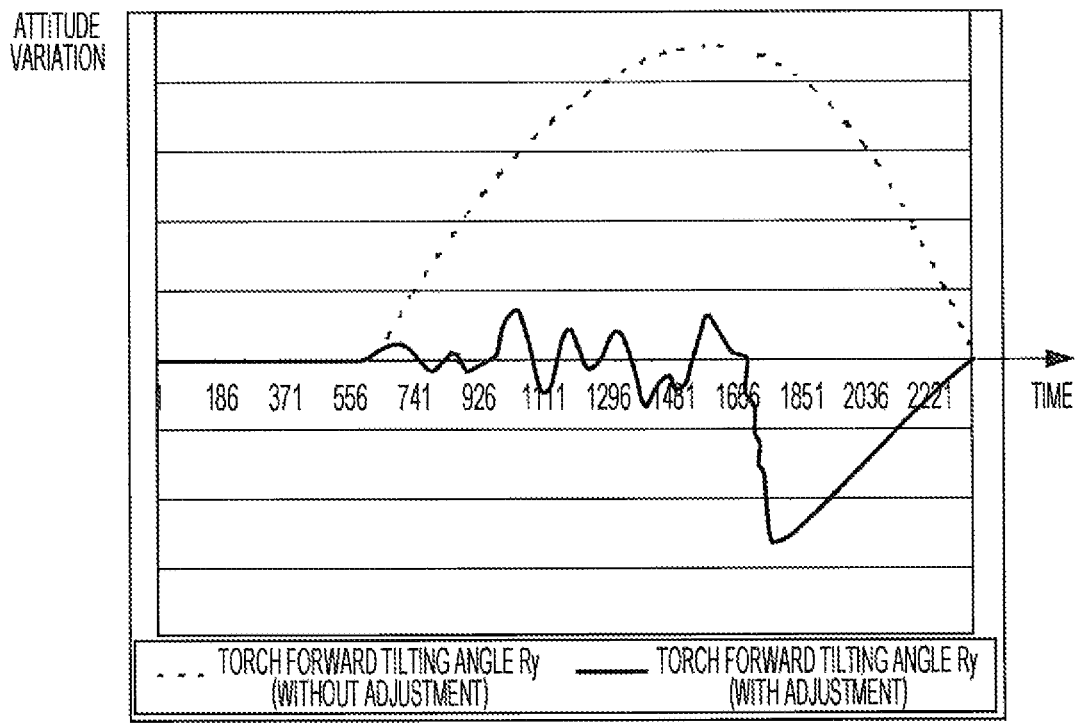
FIG. 21 is an explanatory view to explain the execution result of the particular component suppressing process.
Figure 22:
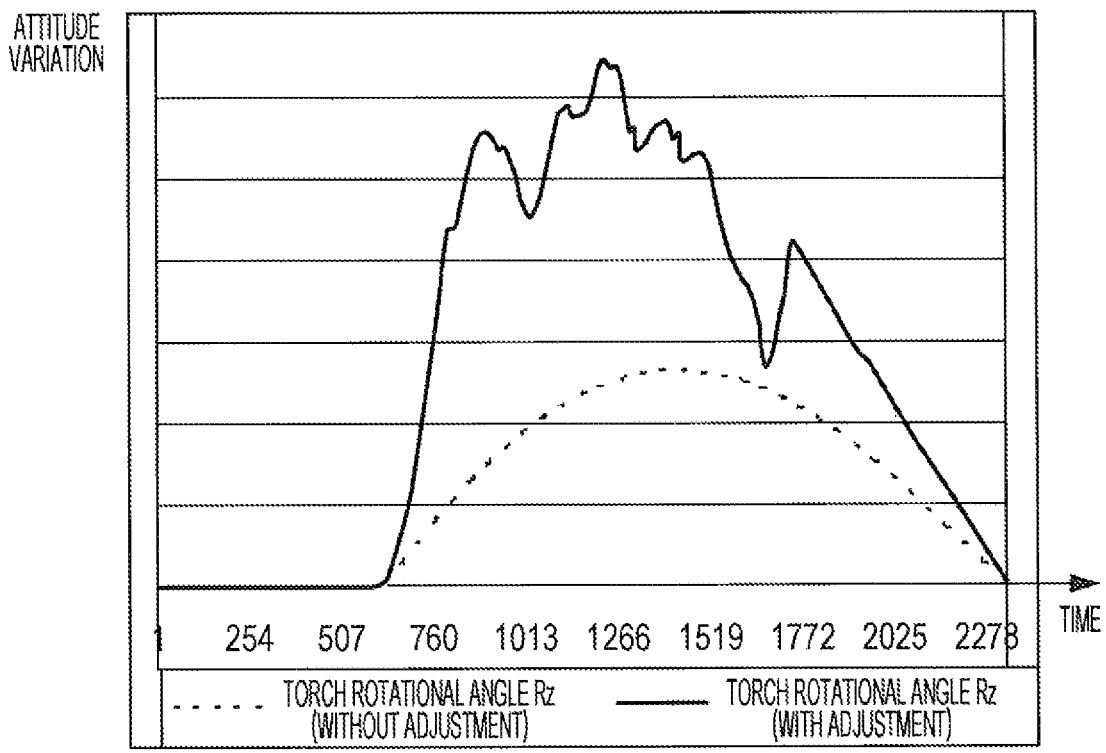
FIG. 22 is an explanatory view to explain the execution result of the particular component suppressing process.
Figure 23:
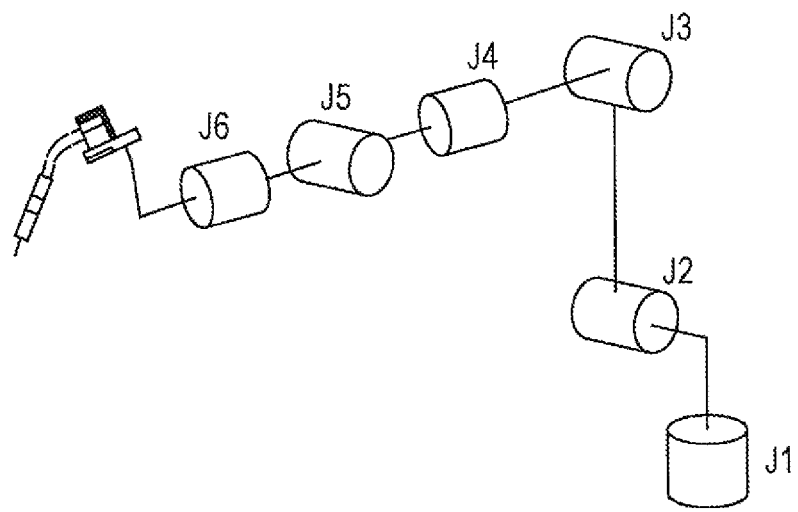
FIG. 23 illustrates a model of an articulated drive system in a general articulated robot.
Figure 24:
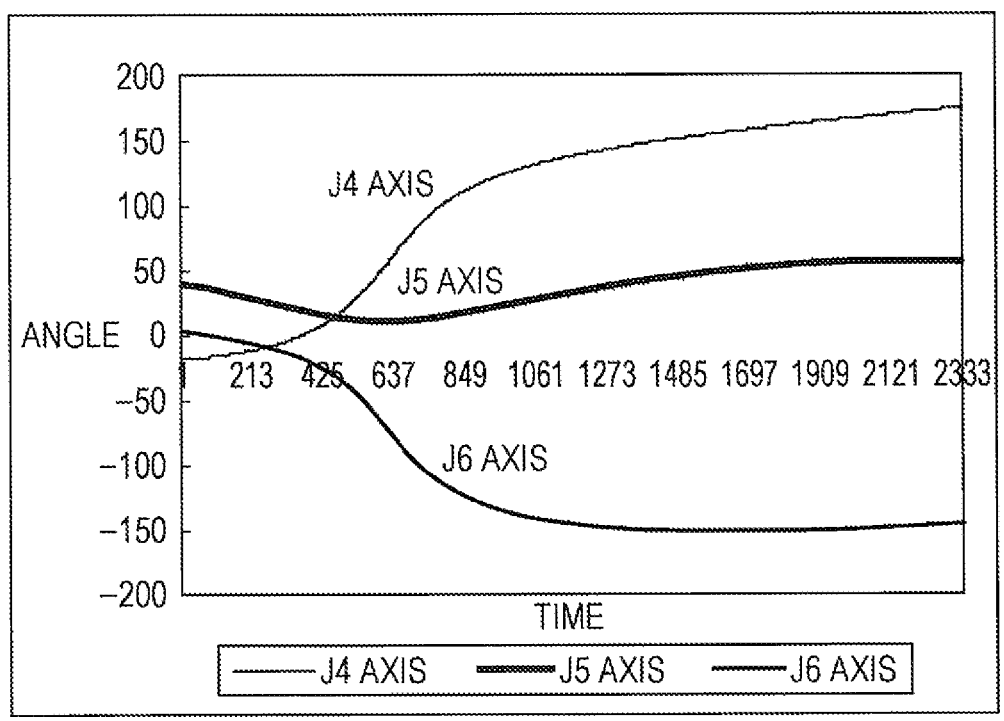
FIG. 24 illustrates an operation example of drive shafts, i.e., J4 axis to J6 axis, in the related art when a manipulator does not come close to a singular attitude.

Thus, as illustrated in FIGS. 20 to 22, variations of the torch inclination angle Rx and the torch forward tilting angle Ry, which are important for the welding work (i.e., which have relatively large weights), can be suppressed with the sacrifice of variations of the torch rotational angle Rz, which is less important for the welding work (i.e., which has relatively small weight). It is to be noted that broken lines in FIGS. 20 to 22 represent variations when the drive shafts 34 to 36 are linearly operated without executing the particular component suppressing process.

Example 5

In above step S64, the control device 1 may execute a process of detecting whether or not the first articulated drive system comes close to the singular attitude (singular point), and may further execute a process of, if it is determined that the first articulated drive system comes close to the singular attitude, making smooth transition from one solution of the inverse kinematic problem, calculated in above step S5, to the other solution.

Furthermore, when the control device 1 makes the transition from one solution of the inverse kinematic problem to the other solution, it is desirable that the angles of the drive shafts 34 to 36 are smoothly transited from one solution of the inverse kinematic problem to the other solution while, as in EXAMPLE 4, one of plural candidates is selected in order to suppress variations of the preset one or two particular components of the attitude angles (i.e., the torch inclination angle Rx, the torch forward tilting angle Ry, and the torch rotational angle Rz) of the end effector 2 in the weld line coordinate system Σline.

When the process of avoiding the singular attitude (avoiding process) is executed as in the above-described example, means for indicating that the avoiding process is under execution, i.e., means for informing, to the outside, the fact that the articulated robot 3 is in the state avoiding the singular attitude, is preferably provided.

Figure 25:
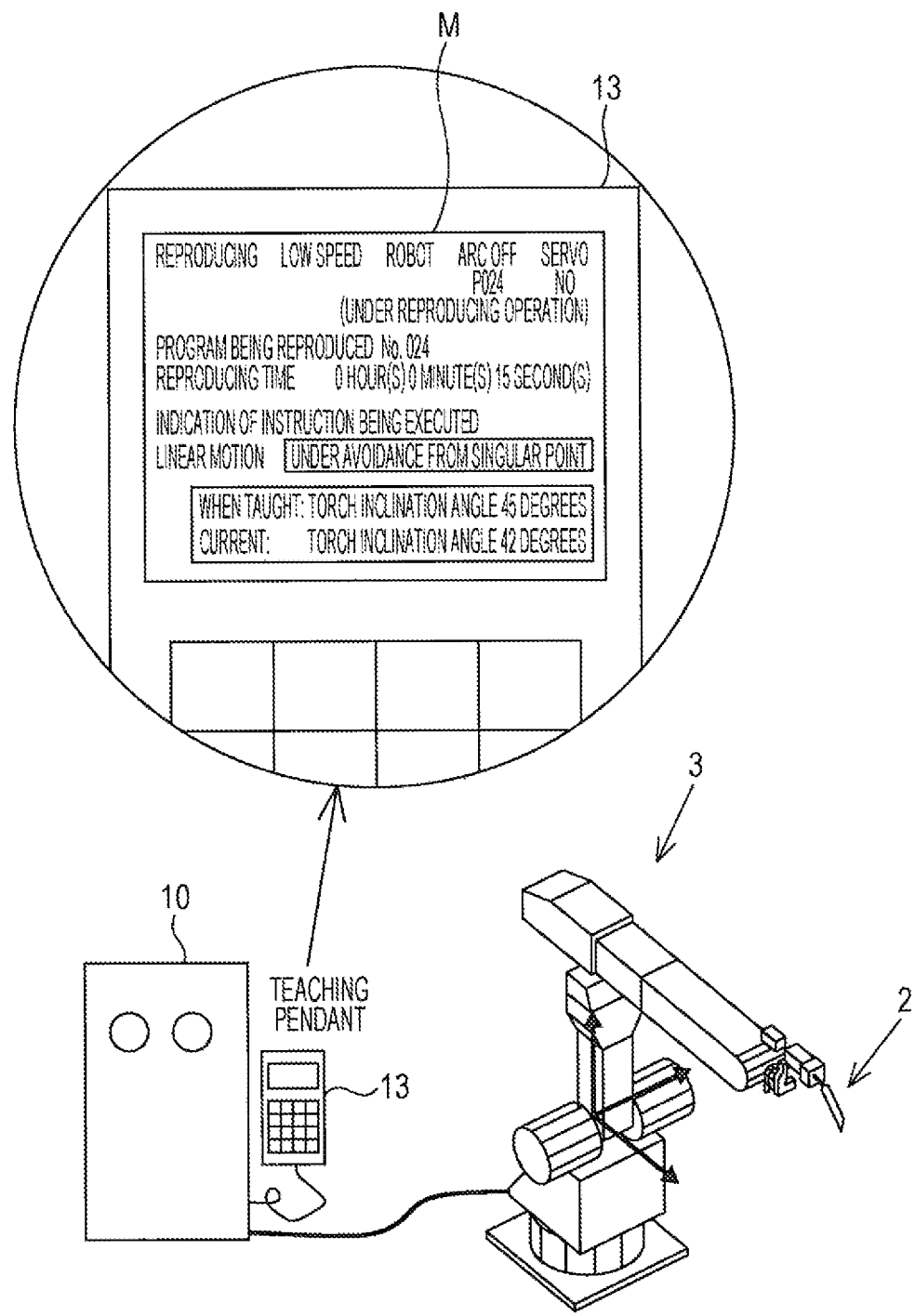
FIG. 25 is an explanatory view to explain a device for informing that the singular attitude is being avoided.

In more detail, as illustrated in FIG. 25, a message "Under Avoidance from Singular Point", indicating the state that the articulated robot 3 is in the state avoiding the singular attitude, is displayed on a display screen M of the operating unit 13 (teaching pendant). The indication denoting the state under avoidance from the singular attitude is not limited to the message "Under Avoidance from Singular Point", and it may be presented in any expression insofar as the expression surely represents the state under avoidance from the singular attitude.

By displaying the indication denoting the state under avoidance from the singular point as described above, an operator can confirm during the welding whether the articulated robot 3 is in the state avoiding the singular point or in the state not avoiding the singular point. Therefore, for example, when quality check is performed after welding of a workpiece (material), the operator can more closely inspect the position where the welding has been performed in the state avoiding the singular attitude.

Furthermore, the operator can visually monitor, e.g., the entire motion of the articulated robot 3 in the state avoiding the singular attitude, and can recheck the entire motion of the articulated robot 3 based on the monitoring result, for example, when the articulated robot 3 is operated again in next welding work.

In addition to presenting the indication "Under Avoidance from Singular Point", it is also possible to display the type of a processing program (e.g., the number of the program being reproduced) on the display screen M so that the operator can recognize what processing program is reproduced, or to display a time during which the processing program is executed (i.e., a reproducing time) and a motion of the end effector 2 (e.g., a linear motion) on the display screen M. Moreover, torch information (e.g., the torch inclination angle, the torch forward tilting angle, and the torch rotational angle) that has been taught in advance, and current torch information may be displayed on the display screen M.

As a result, the operator can understand the detailed situations of the articulated robot 3 in the state "Under Avoidance from Singular Point".

While, in the above-described example, the fact that the process of avoiding the singular point is being executed is displayed on the display screen M, the state under the execution of the process of avoiding the singular point may be informed with sounds using a, e.g., loudspeaker, or with light by illuminating or blinking a lamp, for example, instead of using the display screen M. The state under the execution of the process of avoiding the singular point may be displayed on an external display device that is separate from the teaching pendant 13 of the articulated robot.

Additionally, the time in the state "Under Avoidance from Singular Point" may be stored as log data in the storage unit 12 of the control device 10. After the end of the welding, for example, the time history during the state under avoidance from the singular point may be displayed on the display screen M of the operating unit 13 (teaching pendant) such that the operator or any other person can confirm the time history during the state under avoidance from the singular point.

REFERENCE SIGNS LIST

1: control device of articulated robot
11: computing unit
12: storage unit
13: operating unit
2: end effector
3: articulated robot
31 to 36: drive shafts

The invention claimed is:

1. An articulated robot control device for controlling an articulated robot including a first articulated drive system, which includes three drive shafts for changing an attitude of a working part disposed at a forward end, and a second articulated drive system, which includes at least three drive shafts for changing a position of the first articulated drive system, the control device comprising:
   an interpolation point calculator for calculating a plurality of interpolation points to move a position of the working part at a predetermined speed on a teaching path interconnecting respective positions and attitudes at a work start point and a work end point, which are set in advance;
   a driving controller for driving the first articulated drive system and the second articulated drive system in accordance with the interpolation points calculated by the interpolation point calculator;
   an exception condition determiner for determining whether or not a preset exception condition, which is different from a condition for detecting a singular attitude of the first articulated drive system, is satisfied when the first articulated drive system and the second articulated drive system are driven by the driving controller; and
   an exceptional operator for, after the exception condition determiner determines that the exception condition is satisfied, calculating respective angles of the drive shafts of the first articulated drive system, the angles being adapted to linearly change the drive shafts of the first articulated drive system with angles to be taken at the work end point being targets, until the working part reaches the work end point, calculating respective angles of the drive shafts of the second articulated drive system based on the respective calculated angles of the drive shafts of the first articulated drive system and on the position of the working part at a next interpolation point calculated by the interpolation point calculator, and driving the respective drive shafts of the first articulated drive system and the second articulated drive system based on calculation results;
   wherein the exception condition is given as a condition that a speed of at least one of the drive shafts of the first articulated drive system, which is defined by a remaining moving time or a remaining moving distance from a next interpolation point to the work end point, exceeds a preset allowable range when the respective angles of the drive shafts of the first articulated drive system are made to reach the angles to be taken at the work end point in the remaining moving time or the remaining moving distance of the working part from the next interpolation point.

2. The articulated robot control device according to claim 1, further comprising a deviation amount detector for detecting a deviation amount between the working part and a work line of a workpiece, a copying controller for moving the working part to trace the work line based on the deviation amount detected by the deviation amount detector, and a work end point updater for updating the work end point by adding the deviation amount, which is detected by the deviation amount detector, to the work end point,
   wherein the exception condition determiner and/or the exceptional operator executes processing based on the work end point after being updated by the work end point updater.

3. The articulated robot control device according claim 1, wherein the exceptional operator comprises:
   an angle candidate calculator for calculating a plurality of angle candidates for each of the drive shafts within a range of angle closer to the target than when each of the drive shafts of the first articulated drive system is linearly operated with the angle to be taken at the work end point being the target; and
   an angle selector for selecting, from the angle candidates calculated by the angle candidate calculator, one candidate at which variations of preset one or two particular angles among three attitude angles in a work coordinate system, as viewed from the working part, at a next interpolation point are most suppressed, when the angle candidates are each separately employed.

4. A control method for an articulated robot for controlling an articulated robot including a first articulated drive system, which includes three drive shafts for changing an attitude of a working part disposed at a forward end, and a second articulated drive system, which includes at least three drive shafts for changing a position of the first articulated drive system, the control method comprising:
   an interpolation point calculating step of calculating a plurality of interpolation points to move a position of the working part at a predetermined speed on a teaching path interconnecting respective positions and attitudes at a work start point and a work end point, which are set in advance;
   a driving control step of driving the first articulated drive system and the second articulated drive system in accordance with the interpolation points calculated in the interpolation point calculating step;
   an exception condition determining step of determining whether or not a preset exception condition, which is different from a condition for detecting a singular attitude of the first articulated drive system, is satisfied when the first articulated drive system and the second articulated drive system are driven in the driving control step; and an exceptional operation step of, after the exception condition determining step determines that the exception condition is satisfied, calculating respective angles of the drive shafts of the first articulated drive system, the angles being adapted to linearly change the drive shafts of the first articulated drive system with angles to be taken at the work end point being targets, until the working part reaches the work end point, calculating respective angles of the drive shafts of the second articulated drive system based on the respective calculated angles of the drive shafts of the first articulated drive system and on the position of the working part at a next interpolation point calculated in the interpolation point calculating step, and driving the respective drive shafts of the first articulated drive system and the second articulated drive system based on calculation results;

wherein the exception condition is given as a condition that a speed of at least one of the drive shafts of the first articulated drive system, which is defined by a remaining moving time or a remaining moving distance from a next interpolation point to the work end point, exceeds a preset allowable range when the respective angles of the drive shafts of the first articulated drive system are made to reach the angles to be taken at the work end point in the remaining moving time or the remaining moving distance of the working part from the next interpolation point.

5. A control program for an articulated robot for controlling an articulated robot including a first articulated drive system, which includes three drive shafts for changing an attitude of a working part disposed at a forward end, and a second articulated drive system, which includes at least three drive shafts for changing a position of the first articulated drive system, the program causing a processor to execute:

an interpolation point calculating step of calculating a plurality of interpolation points to move a position of the working part at a predetermined speed on a teaching path interconnecting respective positions and attitudes at a work start point and a work end point, which are set in advance;

a driving control step of driving the first articulated drive system and the second articulated drive system in accordance with the interpolation points calculated in the interpolation point calculating step;

an exception condition determining step of determining whether or not a preset exception condition, which is different from a condition for detecting a singular attitude of the first articulated drive system, is satisfied when the first articulated drive system and the second articulated drive system are driven in the driving control step; and an exceptional operation step of, after the exception condition determining step determines that the exception condition is satisfied, calculating respective angles of the drive shafts of the first articulated drive system, the angles being adapted to linearly change the drive shafts of the first articulated drive system with angles to be taken at the work end point being targets, until the working part reaches the work end point, calculating respective angles of the drive shafts of the second articulated drive system based on the respective calculated angles of the drive shafts of the first articulated drive system and on the position of the working part at a next interpolation point calculated in the interpolation point calculating step, and driving the respective drive shafts of the first articulated drive system and the second articulated drive system based on calculation results;

wherein the exception condition is given as a condition that a speed of at least one of the drive shafts of the first articulated drive system, which is defined by a remaining moving time or a remaining moving distance from a next interpolation point to the work end point, exceeds a preset allowable range when the respective angles of the drive shafts of the first articulated drive system are made to reach the angles to be taken at the work end point in the remaining moving time or the remaining moving distance of the working part from the next interpolation point.

* * * * *